US012535990B2

(12) United States Patent
Lee et al.

(10) Patent No.: US 12,535,990 B2
(45) Date of Patent: Jan. 27, 2026

(54) REFRIGERATOR, HOME APPLIANCE, AND CONRTOL METHOD THEREOF

(71) Applicant: LG Electronics Inc., Seoul (KR)

(72) Inventors: Ikkyu Lee, Seoul (KR); Jaemin Kim, Seoul (KR); Jaeyong Won, Seoul (KR)

(73) Assignee: LG Electronics Inc., Seoul (KR)

( * ) Notice: Subject to any disclaimer, the term of this patent is extended or adjusted under 35 U.S.C. 154(b) by 218 days.

(21) Appl. No.: 18/238,762

(22) Filed: Aug. 28, 2023

(65) Prior Publication Data

US 2024/0069861 A1    Feb. 29, 2024

(30) Foreign Application Priority Data

Aug. 29, 2022 (KR) .......................... 10-2022-0108390

(51) Int. Cl.
| | |
|---|---|
| *G06F 3/16* | (2006.01) |
| *F25D 27/00* | (2006.01) |
| *G08C 17/02* | (2006.01) |
| *G10L 15/22* | (2006.01) |

(52) U.S. Cl.
CPC ........... *G06F 3/167* (2013.01); *F25D 27/005* (2013.01); *G06F 3/165* (2013.01); *G08C 17/02* (2013.01); *G10L 15/22* (2013.01); *G10L 2015/223* (2013.01)

(58) Field of Classification Search
USPC ..................................................... 704/1–504
See application file for complete search history.

(56) References Cited

U.S. PATENT DOCUMENTS

| | | | | |
|---|---|---|---|---|
| 10,599,392 | B2 * | 3/2020 | Jeon .......................... | F25D 23/02 |
| 10,877,728 | B2 * | 12/2020 | Jeon .......................... | F25D 23/02 |
| 11,314,215 | B2 * | 4/2022 | Rexach ..................... | C02F 1/50 |
| 11,713,919 | B2 * | 8/2023 | Lee .......................... | F25D 23/028 |
| | | | | 62/126 |
| 2015/0336786 | A1 * | 11/2015 | Gardner .................... | F24C 7/08 |
| | | | | 222/1 |
| 2017/0069324 | A1 * | 3/2017 | Gardner .................. | G10L 15/22 |
| 2018/0189027 | A1 * | 7/2018 | Jeon .......................... | F25D 23/02 |
| 2019/0090056 | A1 * | 3/2019 | Rexach ..................... | G06F 3/167 |
| 2020/0072544 | A1 * | 3/2020 | Lee .......................... | F25D 11/02 |
| 2020/0183649 | A1 * | 6/2020 | Jeon ...................... | A47F 3/0434 |
| 2021/0203520 | A1 * | 7/2021 | Rexach ................... | G10L 15/22 |

(Continued)

FOREIGN PATENT DOCUMENTS

| | | |
|---|---|---|
| EP | 3546869 | 10/2019 |
| JP | 2021-181876 | 11/2021 |
| KR | 10-2010-0013555 | 2/2010 |

OTHER PUBLICATIONS

Extended European Search Report in European Appln. No. 23189416.3, mailed on Jan. 15, 2024, 9 pages.

(Continued)

*Primary Examiner* — Marcus T Riley
(74) *Attorney, Agent, or Firm* — Fish & Richardson P.C.

(57) ABSTRACT

A refrigerator includes: a cabinet defining a storage space, a door configured to open and close the storage space, a microphone configured to receive voice, a speaker configured to output audio, and a controller configured to, based on the microphone receiving a voice command and the audio being output, operate the refrigerator according to the voice command.

19 Claims, 22 Drawing Sheets

(56) References Cited

U.S. PATENT DOCUMENTS

2024/0069861 A1* 2/2024 Lee .................. F25D 29/00
2024/0195652 A1* 6/2024 Rexach ............. G10L 15/1822

OTHER PUBLICATIONS

Samsung Care, "How to mirror your TV on your Family Hub refrigerator screen with the Smart View/ Samsung US," Jul. 17, 2020, retrieved on Apr. 11, 2024, retrieved from URL<https://www.youtube.com/watch?v=UILsbxhCZvs>, 2 pages.
Samsung US, "Use Alexa on the family Hub/Samsung," Aug. 25, 2022, retrieved on Apr. 11, 2024, retrieved from URL<https://www.youtube.com/watch?v=XQRngys3Pcs>, 2 pages.
Tizen Indonesia, "Samsung Family Hub 2.0 Voice Demo," Jan. 13, 2017, retrieved on Apr. 11, 2024, retrieved from URL<https://www.youtube.com/watch?v=COrSPprXwcE>, 2 pages.

* cited by examiner

REFRIGERATOR, HOME APPLIANCE, AND CONRTOL METHOD THEREOF

CROSS-REFERENCE TO RELATED APPLICATIONS

This application claims the benefit of priority to Korean Application No. 10-2022-0108390, filed on Aug. 29, 2022. The disclosure of the prior application is incorporated by reference in its entirety.

THE BACKGROUND

1. The Field

The present disclosure relates to a refrigerator, a home appliance, and a control method thereof.

2. Description of the Related Art

Home appliances refer to devices that are mainly provided in the user's home to help with the user's housework, and include refrigerators, air conditioners, air purifiers, vacuum cleaners, cooking appliances, dishwashers, clothes care machines, washing machines, and the like.

In general, a refrigerator is a home appliance equipped with a cooling device and capable of storing stored goods at a low temperature. Recently, refrigerators equipped with various additional functions for user convenience in addition to a cooling function according to various needs of users have been developed and released.

For example, the refrigerator may be controlled according to a user's voice command or provide more diverse functions by communicating with an external device.

For example, Korean Patent Publication No. 10-2010-0013555 discloses a refrigerator that controls a cooling device by recognizing a user's voice command.

However, conventionally, when the speaker is in operation, the user's voice command is not recognized, so the user has to control the refrigerator in a different way, which is inconvenient.

THE SUMMARY

An object of the present disclosure is to provide a refrigerator and a home appliance capable of recognizing a user's voice command even when a speaker is in operation and performing an operation according to the voice command.

A refrigerator according to an embodiment of the present disclosure includes a cabinet forming storage spaces; a door opening and closing the storage space; a microphone module for receiving a user's voice; a speaker module through which music is played; and a controller; in which the controller operates according to the user's voice command when the microphone module receives a user's voice command in a state where music is playing.

The controller may control the speaker module to stop playing music or to lower the volume when the controller is determined that the user's voice includes the trigger voice.

The refrigerator may further include a communication portion, in which the controller is connected to a server through the communication portion to determine a user's voice command received from the microphone module.

The door may include a door body; and a panel assembly mounted on the door body to form a front surface, and the panel assembly may include a lighting device to light the front surface of the door in a set color.

The controller may control the lighting device to change the color or brightness of the front surface of the door when the controller determines that the user's voice includes the trigger voice.

The controller may control the lighting device so that the front surface of the door shines in a color set by the user according to the user's voice command.

The controller may control the lighting device so that the color or brightness of the front surface of the door is changed in conjunction with music played in the speaker module.

The refrigerator may further include a short-range communication portion that allows a user's remote device to be connected to the speaker module, in which the controller may control a speaker module to play music selected by a user through a remote device through the short-range communication portion.

The door may include an opened upper surface and a door cover covering the opened upper surface, in which the door cover may include: a cover portion covering the opened upper surface; and a module mounting portion extending downward from the cover portion and inserted into the inner space of the door, the microphone module may be mounted on the door cover, and the processor module constituting the controller may be provided in the module mounting portion.

The processor module may be connected to the microphone module, the speaker module, and the lighting device.

The processor module may include a voice recognition module for determining the received user's voice command.

The processor module may include a short-range communication portion connectable to a remote device.

According an embodiment of the present disclosure, a method for controlling a refrigerator which includes a cabinet forming a storage space; a door opening and closing the storage space, a microphone module for receiving a user's voice and a speaker module for playing music, the method includes: controlling the speaker module to play music; receiving a user's voice through the microphone module; controlling the speaker module to stop music when the user's voice includes a trigger voice; receiving a user's voice command; controlling a refrigerator according to the received voice command; and controlling the speaker module to play stopped music.

The controlling a refrigerator according to the received voice command may control the lighting device to change the color of the door to a color set by a user.

The controlling the speaker module to play the music may include controlling the lighting device so that the color or brightness of the door is changed in conjunction with the played music.

According an embodiment of the present disclosure, a household appliance includes: a cabinet forming storage spaces; a door opening and closing the storage space; a microphone module for receiving a user's voice; a speaker module through which music is played; and a controller; in which the controller operates according to the user's voice command when the microphone module receives a user's voice command in a state where music is playing.

Refrigerators and home appliances according to an embodiment of the present disclosure can recognize a user's voice command even when the speaker is in operation. Accordingly, there is an advantage in that an operation according to a user's voice command can be performed even when the speaker is in operation.

Refrigerators and home appliances according to an embodiment of the present disclosure have a lighting device inside the door, and the front surface of the door can be brightly lit with a set color by the lighting device. In addition, the color of the front surface of the door may be changed by controlling the lighting device according to the user's voice command. Therefore, the outer appearance of the refrigerator can be changed without replacing a panel forming the front of the door, and the user can easily change the color of the door with a voice command.

In refrigerators and home appliances according to an embodiment of the present disclosure, the color or brightness of the front surface of the door may be changed in conjunction with music being played through a speaker. Therefore, there is an advantage of providing a different kind of fun to the user.

THE DETAILED DESCRIPTION

Hereinafter, specific embodiments of the present disclosure will be described in detail with drawings. However, the present disclosure cannot be said to be limited to the embodiments in which the spirit of the present disclosure is presented, and other degenerative disclosures or other embodiments included in the scope of the present disclosure can be easily suggested by adding, changing, or deleting other components.

The home appliance of the present disclosure is provided with a panel assembly equipped with a lighting device on an outer surface thereof and can change design or color of an outer appearance thereof based on user input.

In addition, the home appliance of the present disclosure may recognize a user's voice command during a speaker operation and perform control according to the voice command. For example, the color of the front surface of the door may be changed to a color set by the user according to a user's voice command while music is being played through a speaker.

Home appliances of the present disclosure may include a refrigerator, an air conditioner, an air purifier, a vacuum cleaner, a cooking appliance, a dishwasher, a clothes care machine, a washing machine, and the like. However, the type of home appliance is not limited to the above example, and may be included without limitation as long as it is provided in the user's home and helps the user with household chores.

First, a refrigerator is described as one type of home appliance, and the description of the refrigerator may be applied to other types of home appliances as well.

Figure 1:
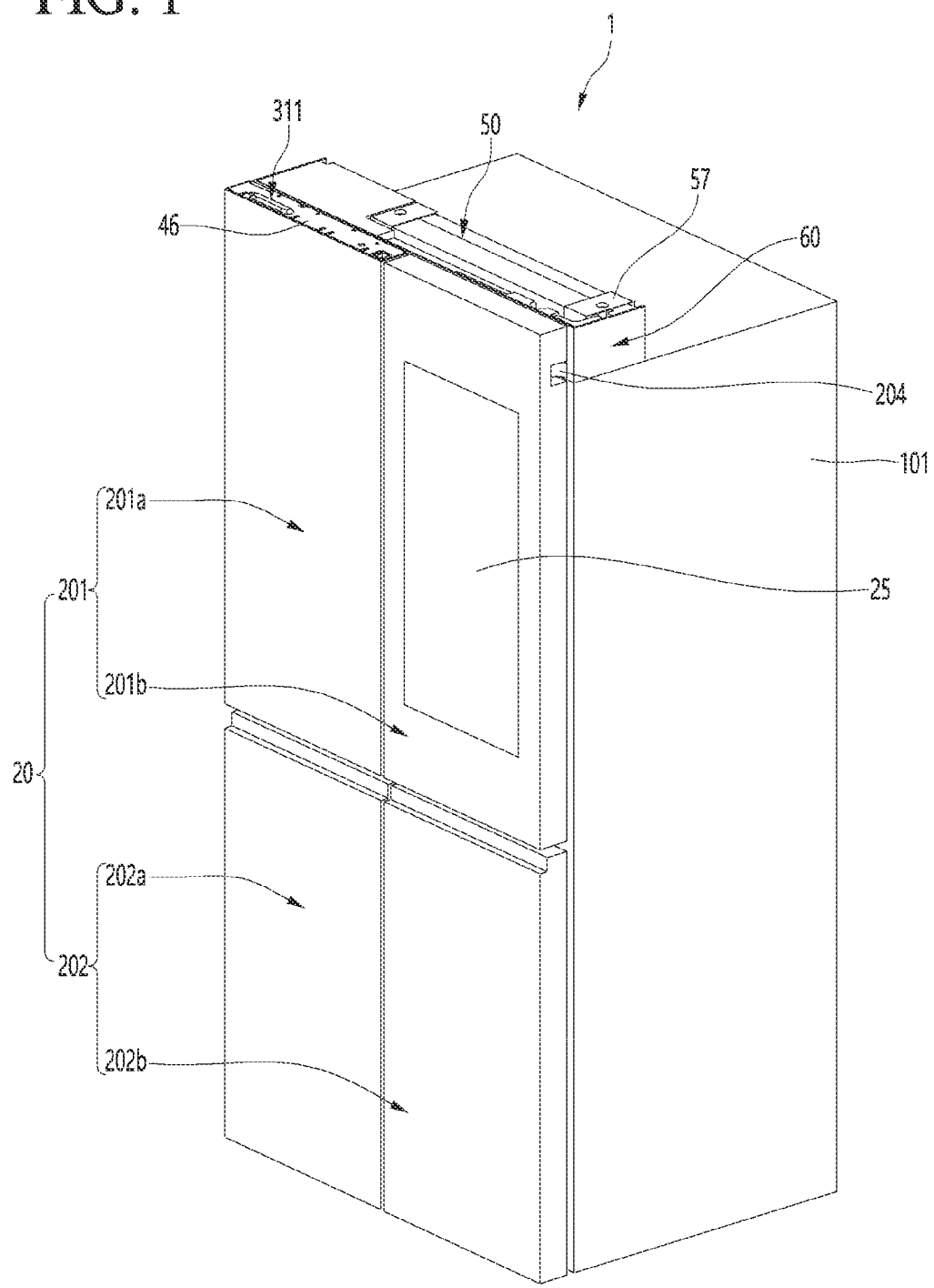
FIG. 1 is a perspective view illustrating a refrigerator according to an embodiment of the present disclosure viewed from the front.
Figure 2:
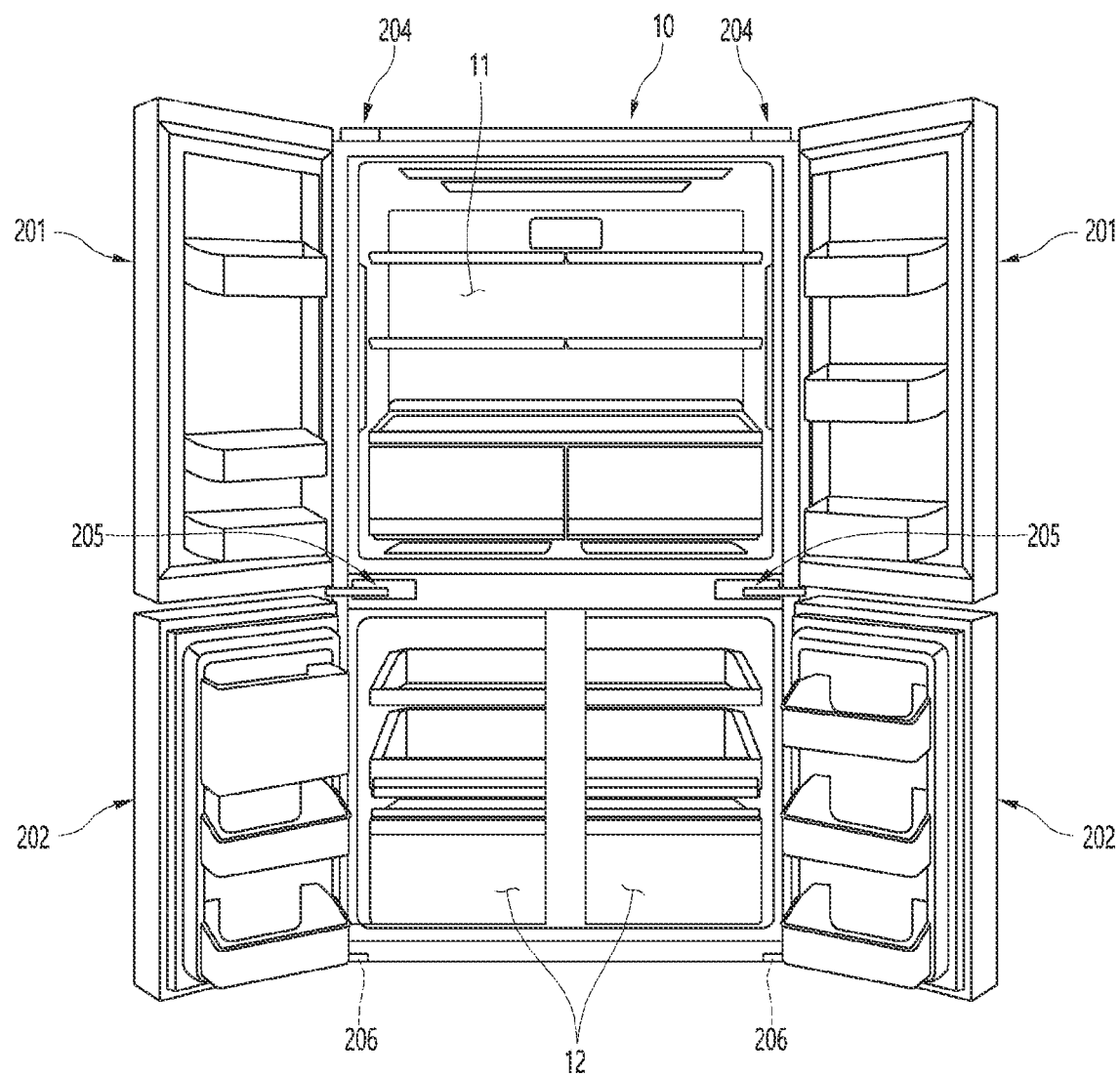
FIG. 2 is a view illustrating a state where the door of the refrigerator is opened, viewed from the front.
Figure 3:
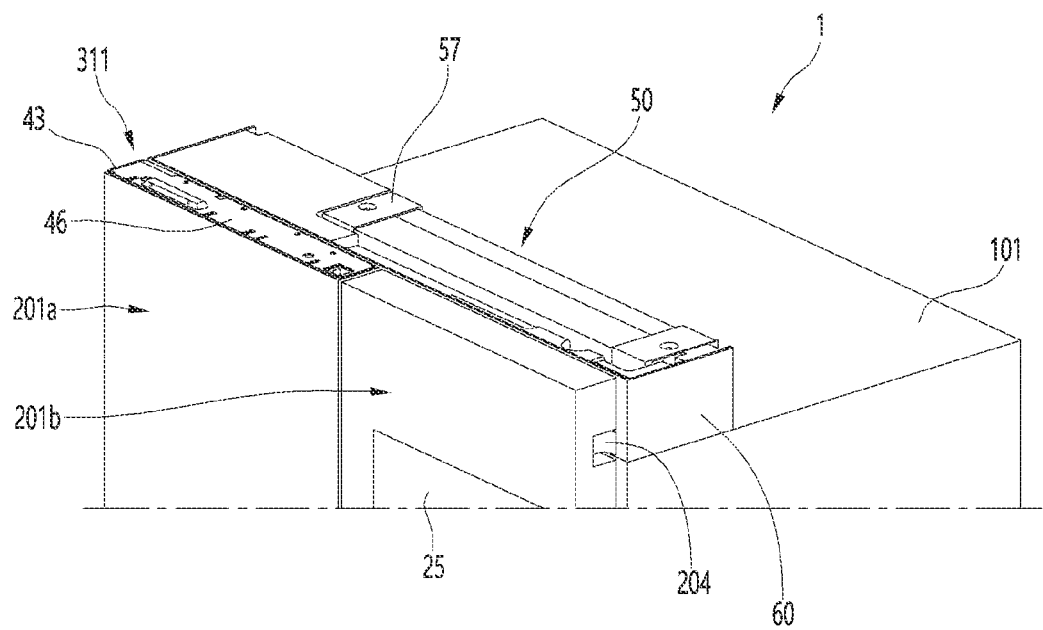
FIG. 3 is a perspective view illustrating a state where the refrigerator is viewed from above.

FIG. 1 is a perspective view illustrating a refrigerator according to an embodiment of the present disclosure viewed from the front, FIG. 2 is a view illustrating a state where the door of the refrigerator is opened, viewed from the front, and FIG. 3 is a perspective view illustrating a state where the refrigerator is viewed from above.

Define direction before description. In the embodiment of the present disclosure, the direction toward the door 20 may be referred to as a front direction based on the cabinet 10 illustrated in FIG. 1, the direction toward the cabinet 10 may be referred to as a rear direction based on the door 20, and the direction toward the bottom surface in which the refrigerator is installed may be referred to as a lower direction, and the direction away from the bottom surface may be referred to as an upper direction.

In addition, according to an embodiment of the present disclosure, a left direction and a right direction may be defined based on a front view of the refrigerator with reference to FIG. 1.

The refrigerator 1 according to the embodiment of the present disclosure may have an outer appearance formed by a cabinet 10 forming a storage space and a door opening and closing the storage space of the cabinet 10.

The cabinet 10 includes an outer case 101 forming an outer appearance of the refrigerator.

An inner case may be disposed inside the outer case 101 to form the storage spaces 11 and 12. In addition, a heat insulating material is filled in the space between the outer case 101 and the inner case.

The cabinet 10 may form a storage space partitioned in the vertical direction. The storage space may be divided into an upper storage space 11 and a lower storage space 12. A refrigerating chamber may be formed in the upper storage space 11. A freezing chamber may be formed in the lower storage space 12.

The door 20 may be configured to open and close the upper storage space 11 and the lower storage space 12, respectively.

The door 20 may include an upper door 201 opening and closing the upper storage space 11 and a lower door 202 opening and closing the lower storage space 12.

As for the upper door 201, a pair of a left upper door 201a and a right upper door 201b may be disposed side by side. In addition, as for the lower door 202, a pair of a left lower door 202a and a right lower door 202b may be disposed side by side.

In addition, each door may be rotatably mounted to the cabinet 10 by hinge devices 204 and 206. Of course, the door 20 may have a structure that is opened and closed by pulling in and out.

The door 20 may form the outer appearance of the front surface of the refrigerator 1 in a closed state.

Any one of the plurality of doors 20 may have a structure capable of seeing through the interior space of the refrigerator. For example, the door body 21 may include a viewing assembly 25 capable of seeing through a space behind the door 20.

Although an embodiment of the present disclosure illustrates a refrigerator 1 having a refrigerating chamber at the upper portion and a freezing chamber at the lower portion, the present disclosure is not limited thereto. For example, the present disclosure can also be applied to a refrigerator in which a freezing chamber is disposed above a refrigerating chamber, or a refrigerating chamber and a freezing chamber are disposed in the left and right direction.

Meanwhile, according to an embodiment of the present disclosure, sound may be output or music may be played in the refrigerator 1 through the speaker module 50. In addition, the refrigerator 1 may be provided with a microphone module 386 for receiving a user's voice.

Hereinafter, the microphone module and the speaker module will be described in detail.

Figure 4:
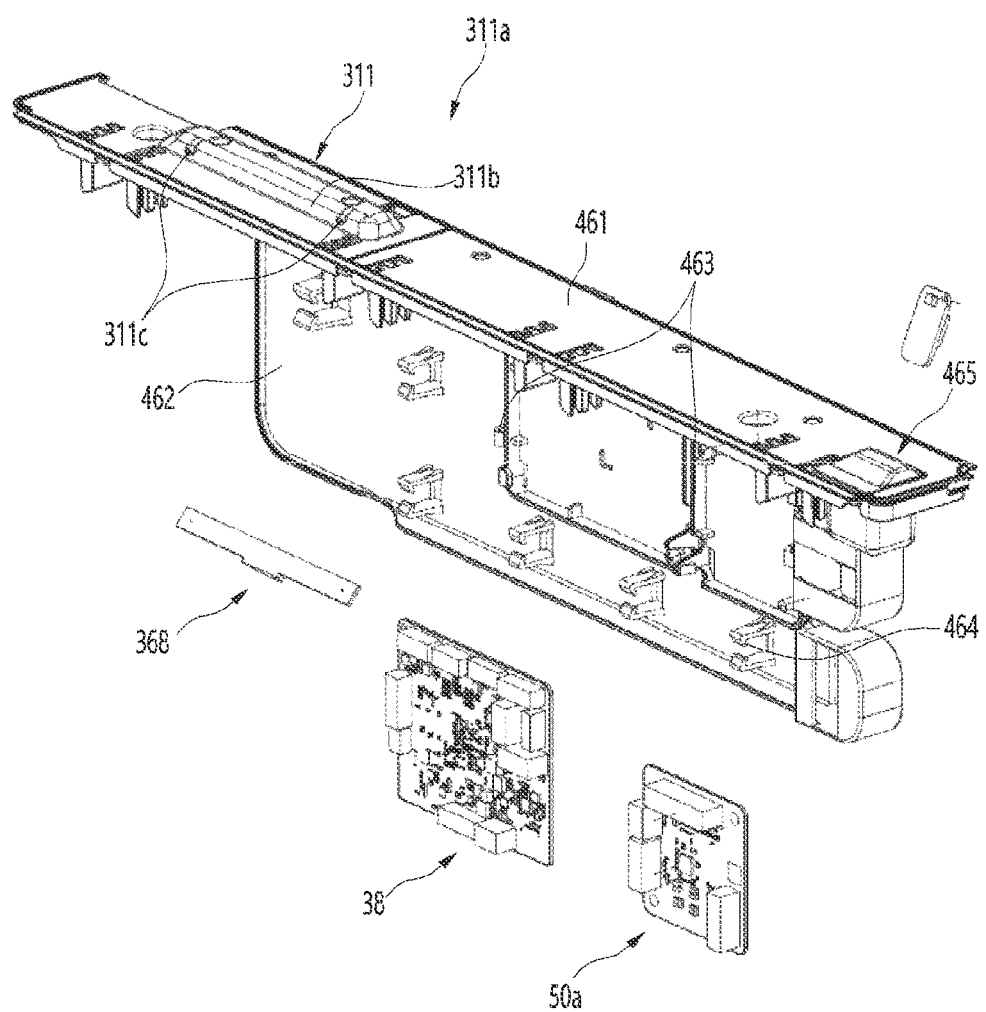
FIG. 4 is an exploded perspective view illustrating a state where an upper cap decoration on which a microphone module is mounted according to an embodiment of the present disclosure is viewed from the front.

FIG. 4 is an exploded perspective view illustrating a state where an upper cap decoration on which a microphone module is mounted according to an embodiment of the present disclosure is viewed from the front.

The microphone module 386 may be mounted on the upper cap decoration 43 forming the upper surface of the door.

In detail, the outer appearance of the door 20 may be formed by combining a panel assembly forming a front surface with the door body. In addition, the upper surface of the door 20 may be formed by the upper cap decoration 43.

The upper cap decoration 43 is formed by opening an upper surface, and the opened upper surface may be shielded by a door cover 46.

A microphone mounting portion 311 to which the microphone module 386 is mounted may be formed on the door cover 46. The microphone mounting portion 311 may be disposed on one side of the door cover 46.

The microphone mounting portion 311 may include a protrusion 311a protruding upward from the door cover 46 and an inclined portion 311b formed at a front end of the protrusion 311a.

The protrusion 311a is the most protrusion of the microphone mounting portion 311 and may protrude parallel to the upper surface of the door cover 51. A microphone mounting boss 317 may be formed below the protrusion 311a. A microphone supporter for supporting the microphone module 386 may be provided below the protrusion 311a. In the microphone mounting boss, the microphone supporter may be fixedly mounted on the lower surface of the protrusion 311a.

The inclined portion 311b may be formed at the front end of the microphone mounting portion 311 and may be inclined downward as the inclined portion extends forward. An open microphone hole 311c is formed in the inclined portion 311b, so that the user's voice can be transferred to the microphone element of the microphone module 386.

The microphone module 386 may include a substrate and a microphone element mounted on the substrate.

Meanwhile, a sensor mounting portion 465 in which a detection sensor is mounted may be formed on the door cover 46. The detection sensor may be an illuminance sensor that detects brightness of an external environment. Alternatively, the detection sensor may be a proximity sensor that detects a user's movement.

The sensor mounting portion 465 may be provided on one side of the door cover 46, and at least a portion thereof may protrude upward from the door cover 46. In addition, in order to sense the external environment, at least a portion of the sensor mounting portion 465 may be formed of a material capable of transmitting light.

The door cover 46 includes a cover portion 461 which is formed in a shape corresponding to the top surface of the door 20 and shields the opened upper portion, and a module mounting portion 462 which provides a space in which a processor module is mounted.

The module mounting portion 462 extends downward from the cover portion 461 and may be inserted into the inner space of the upper cap decoration 43. The module mounting portion 462 may have a structure in which the processor module 38 can be mounted. For example, a fixing rib 463 may be formed on the module mounting portion 462 to prevent movement while the processor module 38 is mounted thereon.

In addition, the module mounting portion 462 may be formed in a structure in which a wire connecting the microphone module 386 and the processor module 38 can be fixed. As an example, a plurality of fixing portions 464 formed in a hook shape may be formed to fix the wire.

The microphone module 386 may be provided on the door cover 46 while being mounted on the microphone mounting portion 311. In addition, the processor module 38 may be accommodated in the inner space of the upper cap decoration 43 while being mounted on the module mounting portion 462.

Meanwhile, a main PCB for controlling driving of a compressor for temperature control of the refrigerator 1 may be provided on one surface of the refrigerator 1. The main PCB may be referred to as the main controller in that the main PCB controls for the refrigerant cycle operation.

The processor module 38 may control the speaker module 50, the microphone module 386 and the lighting device 36. The processor module 38 may recognize a user's voice or control the speaker module 50 according to user settings. In addition, the processor module 38 may control the lighting device 36 to change the color of the door 20. This processor module 38 may be referred to as a controller 38 or an auxiliary controller.

As such, the refrigerator according to an embodiment of the present disclosure may receive a user's voice command through the microphone module 386. When a user gives a command through voice, the voice signal input through the microphone module 386 is processed by the voice module and then transferred to the controller 38 to control a specific operation of the refrigerator.

Hereinafter, the speaker module 50 will be described in detail.

Figure 5:
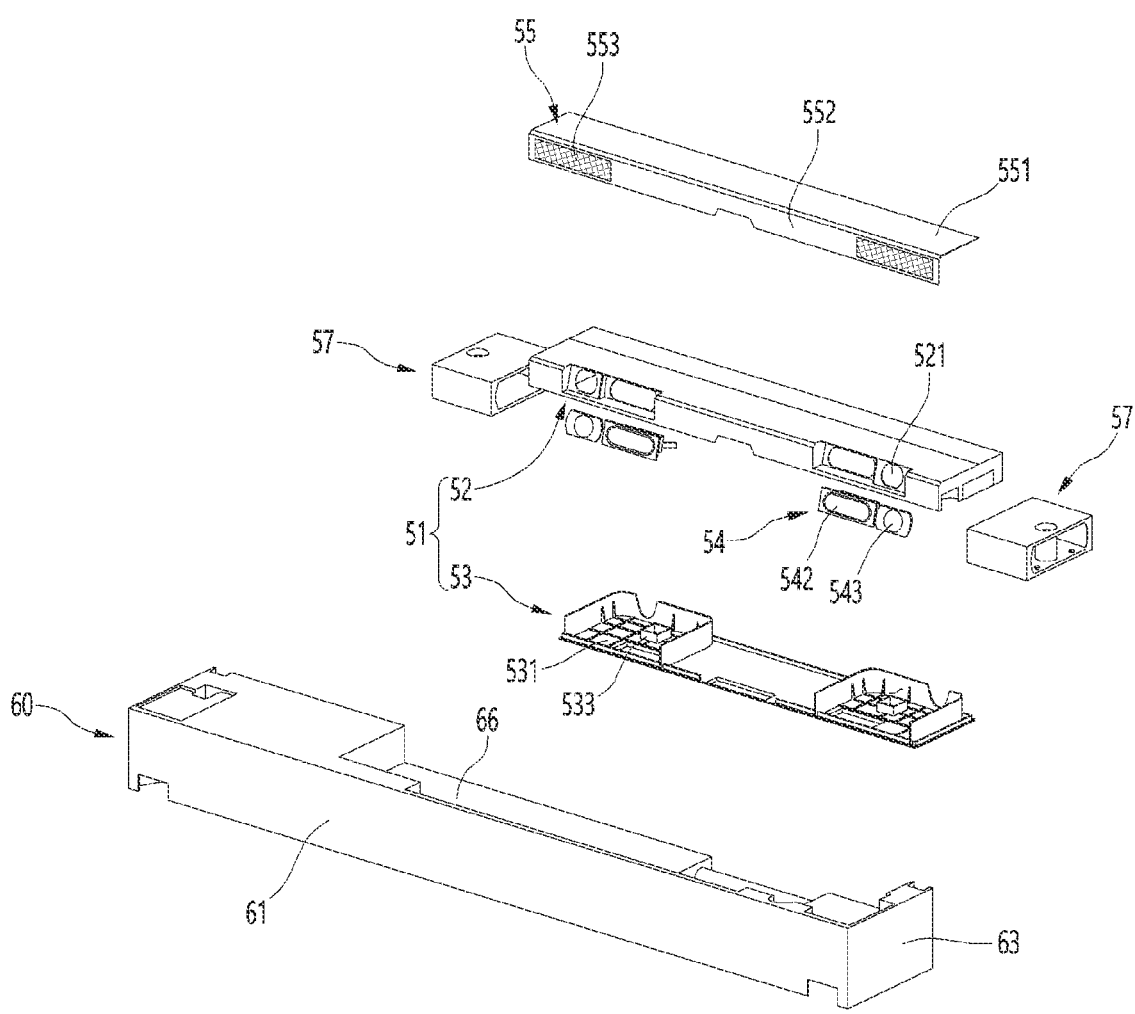
FIG. 5 is an exploded perspective view illustrating a state where a speaker module according to an embodiment of the present disclosure is viewed from the front.

FIG. 5 is an exploded perspective view illustrating a state where a speaker module according to an embodiment of the present disclosure is viewed from the front.

The speaker module 50 may be disposed on the upper surface of the cabinet 10.

The speaker module 50 includes a case 51 providing a space in which components for sound output, such as the sound output portion 54, are accommodated. The case 51 may include a first case 52 and a second case 53. The first case 52 and the second case 53 may be formed to be coupled to each other, and may provide a space for accommodating components of the speaker module 50 therein.

The first case 52 forms an upper surface of the case 51 and may have an opened lower surface. The second case 53 may be formed to cover the open lower surface of the first case 52.

The front surface of the first case 52 may include a sound output hole 521 formed by being opened so that a sound source output from the sound output portion 54 is transferred to the outside.

The sound output holes 521 may be formed on both sides of the first case 52, respectively.

An audio output portion 54 may be provided at a position corresponding to the audio output hole 521.

The sound output portion 54 may include a tweeter speaker 543 and a full range speaker 542. In other words, the sound output portion 54 may include a high-frequency speaker 543 responsible for high-pitched sounds and a low-frequency speaker 542 mainly responsible for mid- and low-pitched sounds.

At this time, the sound output portion 54 may be installed at an angle to the installation area 531. In this case, even if the speaker module 50 is located on the upper surface of the refrigerator and is covered by a door, etc., the sound source of the sound output portion 54 is output upward, so that richer sound can be delivered to the user.

The sound output portion 54 may be mounted on the second case 53. The second case 53 includes an area 531 where the sound output portion 54 is installed. A structure in which the sound output portion 54 can be fixed in an inclinedly disposed state may be provided in the installation area 531. For example, the bottom surface of the second case 53 includes a protrusion 311a formed to protrude upward and surround the sound output portion 54. The protrusion 311a may form a sounding space so that a sound source output from the sound output portion 54 may sound appropriately.

The speaker module 50 may further include a cover 55. The cover 55 may be mounted on the upper surface of the first case 52. The cover 55 may include a cover upper surface portion 551 and a cover front portion 552 bent downward from the cover upper surface portion 551 to at least partially contact the front surface of the first case 52.

A grill portion 553 may be formed on the cover front portion 552 at a position corresponding to the sound output hole 521. The grill portion 553 may cover the sound output hole 521 from the front. In this case, the unity of design of the refrigerator can be further improved.

Meanwhile, the speaker module 50 may further include a bracket 57 for fixing the position of the speaker module 50 while the case 51 is mounted on the hinge cover 60. Brackets 57 may be provided in pairs on both sides of the case 51. The bracket 57 has openings so that at least a portion of the speaker module 50 can be inserted, and both side ends of the speaker module 50 can be fixed.

The speaker module 50 may be provided on one surface of the hinge cover 60. The hinge cover 60 may be provided with hinge devices on both sides.

The hinge cover 60 includes a front portion 61 with at least one surface contacting the door 20 and a side portion 63 forming a side surface.

The hinge cover 60 includes an upper surface portion forming a portion of the upper surface and a recessed portion 66 formed by at least a portion of the upper surface portion being recessed downward. The recessed portion 66 may form at least a portion of the bottom surface of the hinge cover 60.

The recessed portion 66 forms a space in which the speaker module 50 is accommodated. The recessed portion 66 may be formed in a size corresponding to that of the speaker module 50.

Of course, the location where the speaker module 50 is provided is not limited to the hinge cover 60. For example, the speaker module 50 may be independently disposed on the upper surface of the cabinet and spaced apart from the hinge cover 60.

In this way, the refrigerator may output voice through the speaker module 50 or play music according to user settings.

Meanwhile, the refrigerator according to an embodiment of the present disclosure may be configured such that the front surface of the door can shine in a set color. Accordingly, the user can change the overall outer appearance of the refrigerator without replacing a portion of the door.

Hereinafter, the structure of the door 20 will be described in detail.

Figure 6:
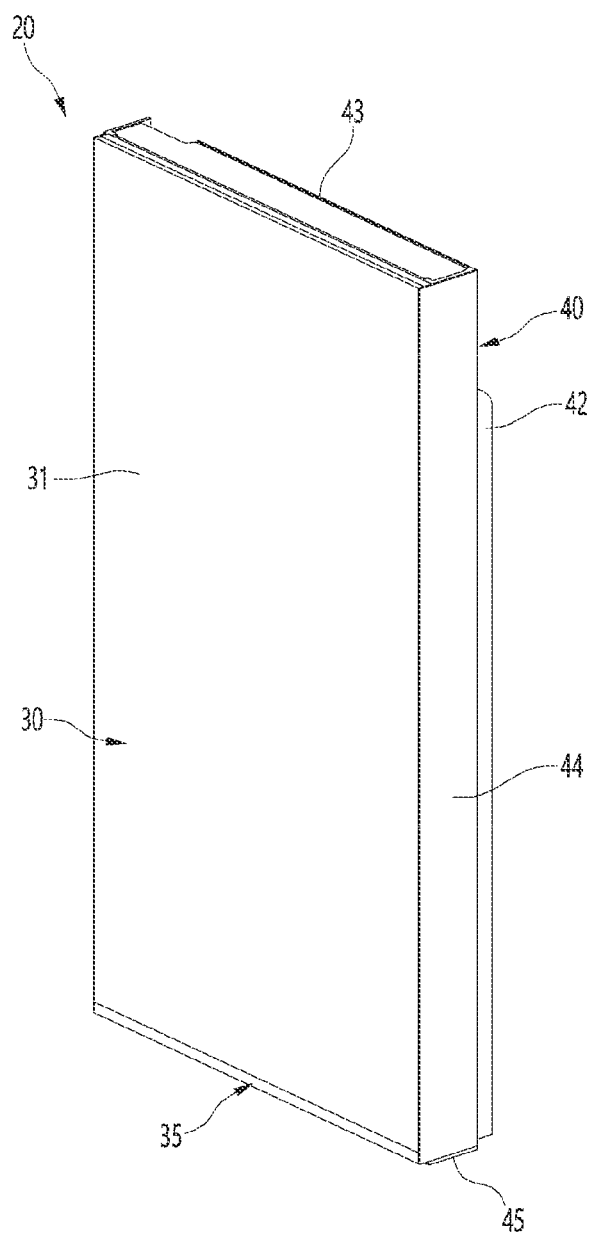
FIG. 6 is a perspective view illustrating a state where a door according to an embodiment of the present disclosure is viewed from the front.
Figure 7:
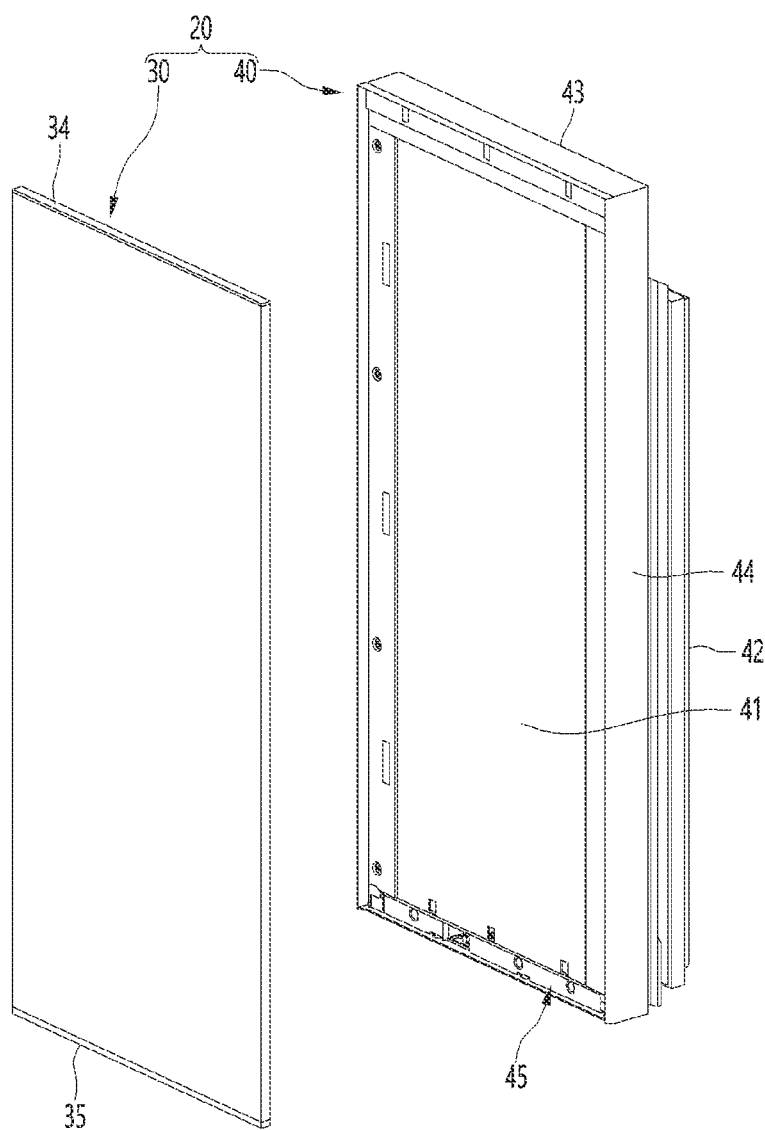
FIG. 7 is a perspective view illustrating a state where a door body constituting a door and a panel assembly are separated.

FIG. 6 is a perspective view illustrating a state where a door according to an embodiment of the present disclosure is viewed from the front, and FIG. 7 is a perspective view illustrating a state where a door body constituting a door and a panel assembly are separated.

The panel assembly 30 may be mounted on the front surface of the door 20 according to the embodiment of the present disclosure.

The door 20 may include a door body 40 forming the overall shape of the door and a panel assembly 30 forming the outer appearance of the front surface of the door 20.

The door body 40 may include a body plate 41 on which the panel assembly 30 is mounted, and a door liner 42 forming a rear surface of the door 20. The door body 40 may include side decorations 44 forming both left and right sides.

The door body 40 may include an upper cap decoration 43 and a lower cap decoration 45 respectively forming upper and lower surfaces of the door body 40.

A heat insulating material 400 may be filled in the space inside the door body 40 and may have a heat insulating structure so that heat transfer does not occur through the door 20.

A space 410 opened forward and accommodating the panel assembly 30 may be formed on the front surface of the door body 40.

The panel assembly 30 may be inserted into the panel accommodation space 410.

When the panel assembly 30 is mounted on the front surface of the door body 40, the panel assembly 30 may form the outer appearance of the front surface of the door 20.

The panel assembly 30 according to the present disclosure may include a lighting device 36 therein so that the entire front surface of the panel assembly 30 emits light.

Hereinafter, various embodiments of the panel assembly 30 equipped with the lighting device 36 will be described.

Figure 8:
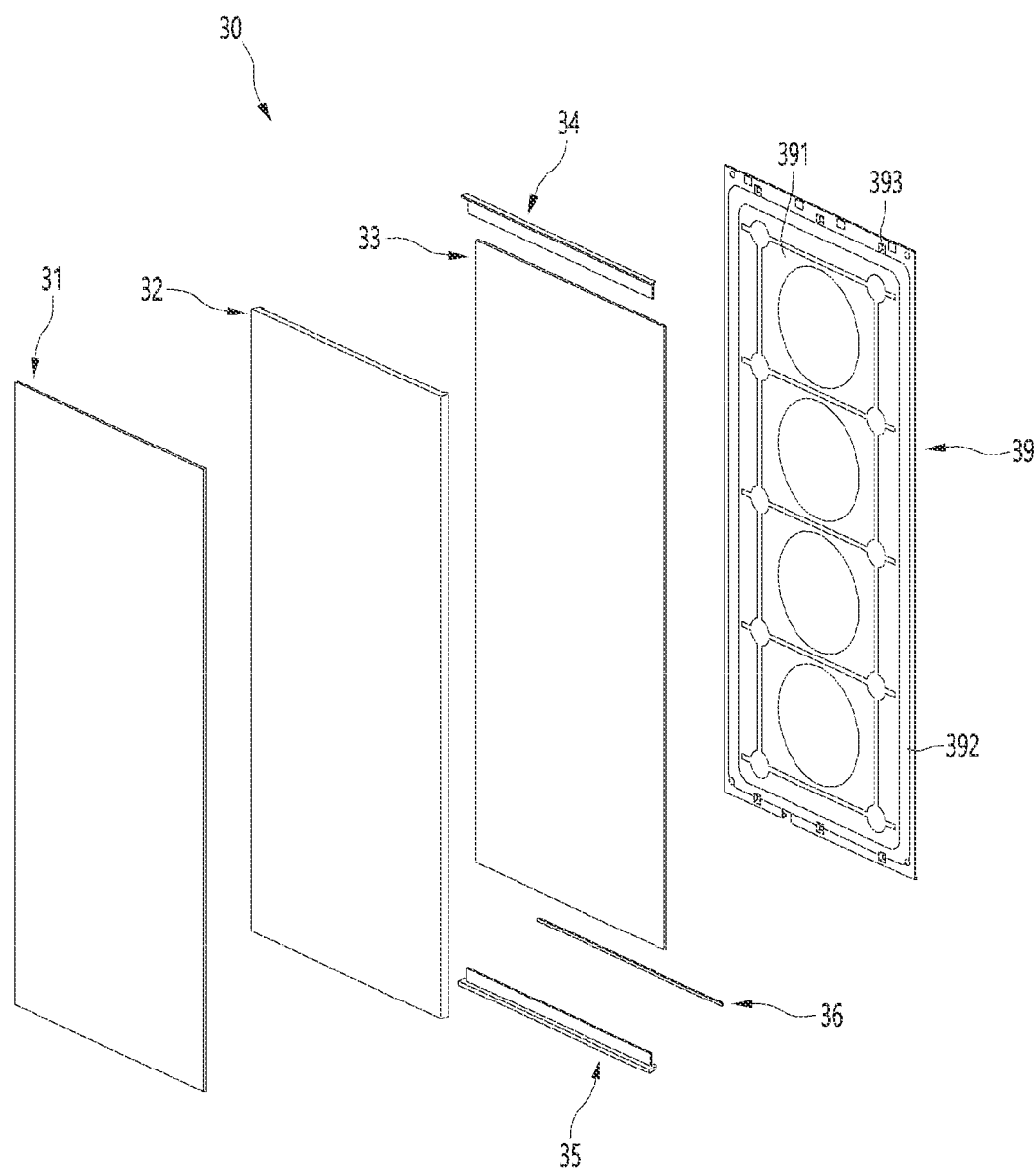
FIG. 8 is an exploded perspective view illustrating a separated state of the panel assembly according to the first embodiment of the present disclosure.
Figure 9:
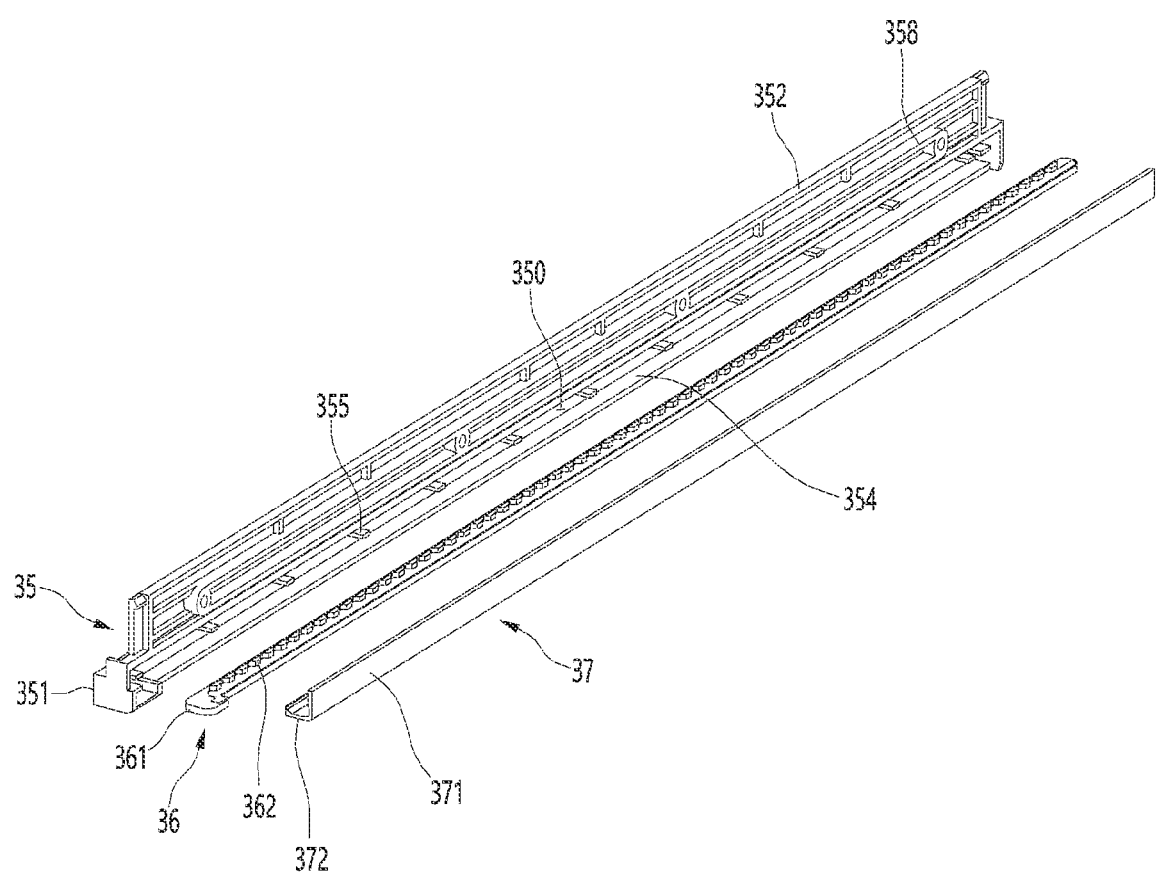
FIG. 9 is an exploded perspective view illustrating a state where a lower bracket constituting the panel assembly according to the first embodiment and a lighting device are separated.
Figure 10:
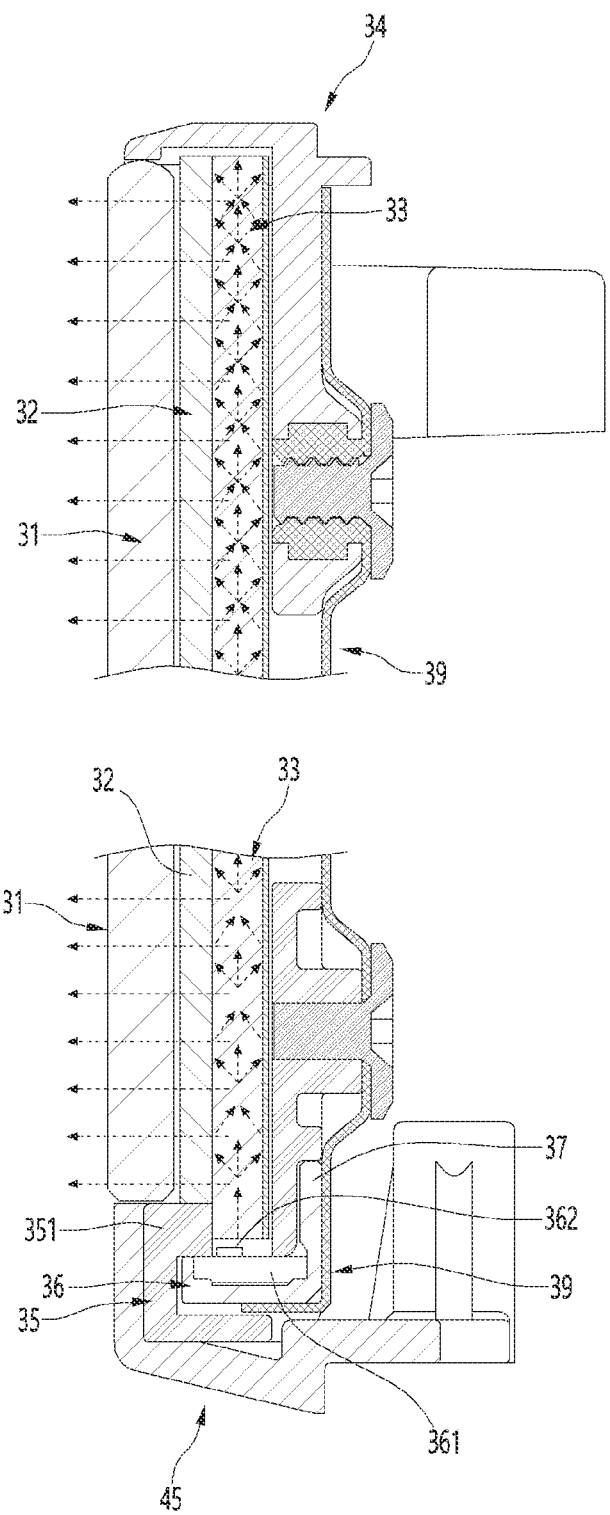
FIG. 10 is a cross-sectional view illustrating a light emitting state of the panel assembly according to the first embodiment.

FIG. 8 is an exploded perspective view illustrating a separated state of the panel assembly according to the first embodiment of the present disclosure, FIG. 9 is an exploded perspective view illustrating a state where a lower bracket constituting the panel assembly according to the first embodiment and a lighting device are separated, and FIG. 10 is a cross-sectional view illustrating a light emitting state of the panel assembly according to the first embodiment.

A panel assembly 30 according to an embodiment of the disclosure may further include a front plate 31 forming an outer appearance of the front surface, a lighting device 36 for emitting light so that the front plate 31 shines, and a light guide plate 33 guiding light emitted from the lighting device 36. In addition, the panel assembly 30 may further include a support member 32.

The panel assembly 30 may further include an upper bracket 34 forming an upper surface of the panel assembly 30 and a lower bracket 35 forming a lower surface of the panel assembly 30.

The lighting device 36 may be mounted on the lower bracket 35. In addition, the panel assembly 30 may further include a back cover 39 forming a rear surface.

The front plate 31 may be transparent so that light reflected by the light guide plate 33 may be transmitted.

The front plate 31 can prevent components inside the panel assembly 30 from being visible to the outside through the front plate 31 by the color of the front plate 31 itself in a state where the lighting device 36 is turned off.

The lighting device 36 may include a substrate 361 and a plurality of light sources 362 arranged on the substrate 361. The light source 362 is composed of a red green blue light emitting diode (RGB LED) and can emit light of various colors.

The light guide plate 33 may be positioned at a rear spaced apart from the front plate 31 and configured to guide light emitted from a lighting device 36 disposed below the light guide plate 33 forward.

The light guide plate 33 may be supported from the rear by the back cover 39. At this time, the support member 32 may be fixed in a state of maintaining a predetermined distance from the front plate 31.

The support member 32 may have a structure in which the light guide plate 33 and the front plate 31 may be fixed. The support member 32 may maintain a predetermined distance between the light guide plate 33 and the front plate 31.

The lighting device 36 is configured to emit light toward the light guide plate 33. The lighting device 36 may be provided inside the lower bracket 35 and may be assembled and mounted together with the lower bracket 35 in a state of being mounted on the lower bracket 35.

The lower bracket front portion 351 may support a portion of the front plate 31. A portion of the lower bracket rear portion 352 may be opened to form an accommodation space 350 in which the lighting device 36 is mounted.

A light guide plate support portion 355 protruding rearward may be formed on the lower bracket front portion 351. An upper surface of the light guide plate support portion 355 may protrude to support a lower end of the light guide plate 33.

The light guide plate support portion 355 and the lower bracket lower portion 354 restrain the lighting device 36 from above and below, so that the lighting device 36 can be restrained.

A light supporter 37 may be provided inside the lower bracket 35. The light supporter 37 may support the lighting device 36 inside the lower bracket 35. The light supporter 37 may dissipate heat generated from the lighting device 36 by conduction.

The light supporter 37 may include a first supporting portion 372 supporting the lighting device 36 and a second supporting portion 371 in contact with the back cover 39.

In this way, the panel assembly 30 is provided with a lighting device 36, and light emitted from the lighting device 36 is transmitted through the front plate 31 by the light guide plate, so that the front surface of the door can brightly shine.

Figure 11:
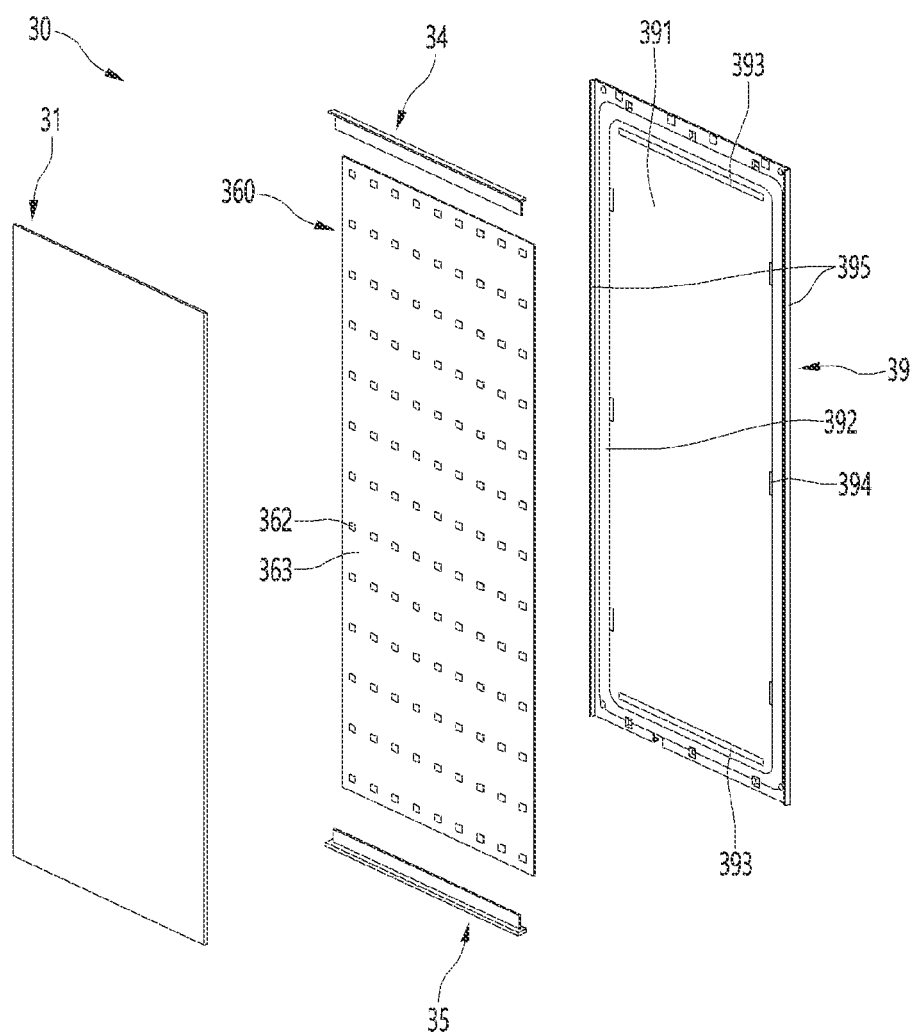
FIG. 11 is a view illustrating a separated state of the panel assembly according to the second embodiment.

FIG. 11 is a view illustrating a separated state of the panel assembly according to the second embodiment.

The panel assembly according to the second embodiment may include a lighting device 36 for emitting light to the front side, and the back cover 39 supporting the lighting device 36 from the rear and forming an outer appearance of the rear surface of the panel assembly 30.

The panel assembly 30 may further include an upper bracket 34 forming an upper surface and a lower bracket 35 forming a lower surface.

The lighting device 36 may include a plate-shaped substrate 361 and a plurality of LEDs 364 disposed on the front surface of the substrate 361.

As another example, the lighting device 36 may include a base 363 and a plurality of LEDs 364 mounted on the base 363. The base 363 may be formed of one or more sheets and may be configured in the form of a film.

Figure 12:
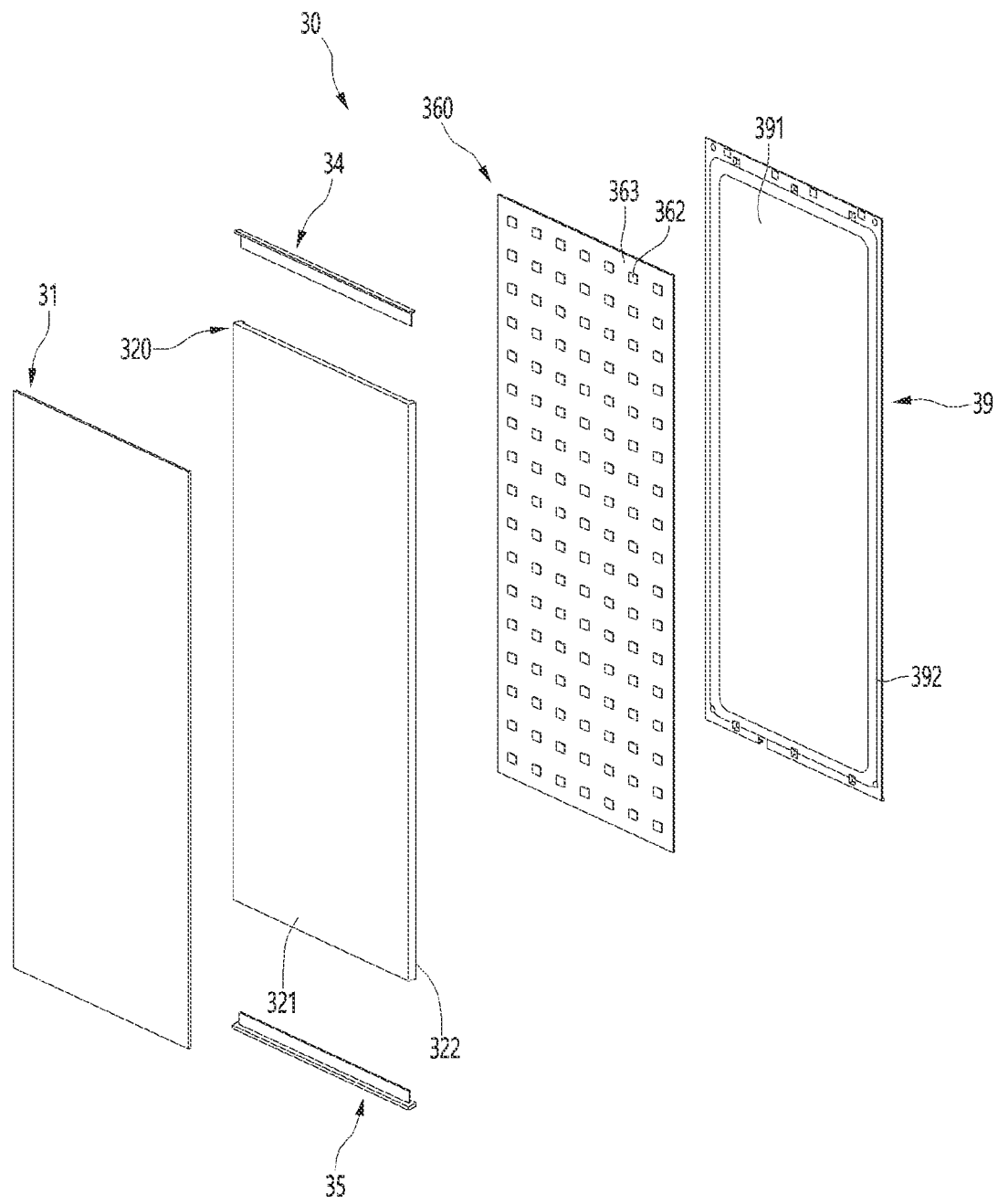
FIG. 12 is a view illustrating a separated state of the panel assembly according to the third embodiment.
Figure 13:
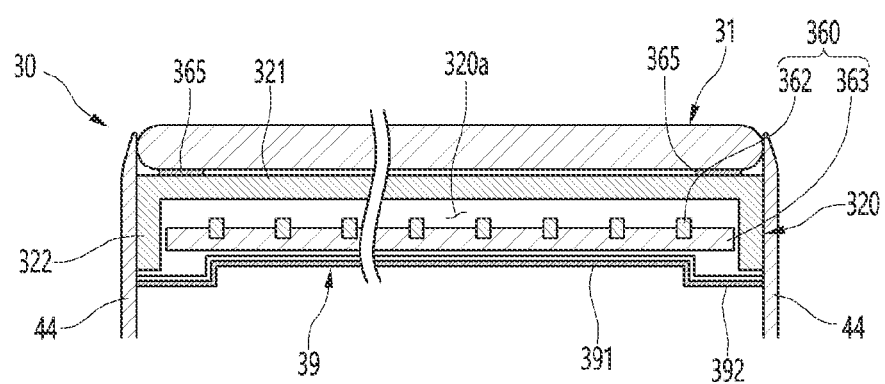
FIG. 13 is a cross-sectional view illustrating a panel assembly according to a third embodiment.

FIG. 12 is a view illustrating a separated state of the panel assembly according to the third embodiment, and FIG. 13 is a cross-sectional view illustrating a panel assembly according to a third embodiment.

The panel assembly according to the third embodiment, in the panel assembly according to the second embodiment, may further include a separation portion 320 provided between the front plate 31 and the lighting device 360.

The separation portion 320 may be fixedly mounted on the rear surface of the panel assembly 30. The separation portion 320 may include a plate-shaped front portion 321 and side portions 322 protruding rearward from both left and right side ends of the front portion 321.

As such, an air gap 320a may be formed between the panel 30 and the lighting device 36 by the separation portion 320. By forming an air gap between the lighting device 360 and the panel 30, the diffusion of the light emitted from the light source can be expanded. Accordingly, there is an advantage in expressing more natural colors and images on the front surface of the door.

This separation portion 320 may also be called a support member in terms of supporting the front plate from the rear.

Figure 14:
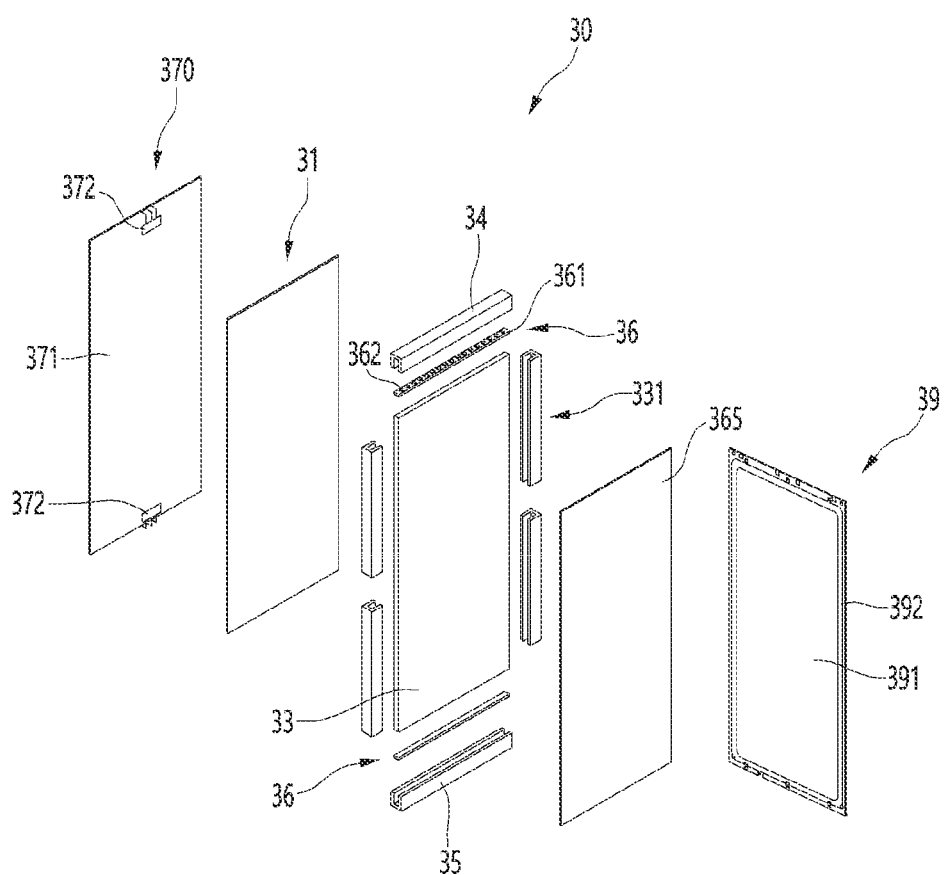
FIG. 14 is an exploded perspective view illustrating a state where the panel assembly according to the fourth embodiment is separated.

FIG. 14 is an exploded perspective view illustrating a state where the panel assembly according to the fourth embodiment is separated.

A panel assembly according to the fourth embodiment includes an electrophoretic panel 370 and a front plate 31. In addition, if necessary, the panel assembly may further include a lighting device 36.

Such an electrophoretic panel may include an activation film (front plane laminate, FPL) on which ink capsules are provided.

The panel main body 371 may include an upper electrode layer provided above the activation film and a lower electrode layer provided below the activation film. Each of the upper electrode layer and the lower electrode layer may be electrically connected to the panel connector 372.

A lighting device 36 and a light guide plate 33 guiding light emitted from the lighting device 36 may be provided behind the front plate 31.

If necessary, side brackets 331 may be provided on both sides of the light guide plate 33 so that both end portions of the light guide plate 33 are inserted.

If necessary, a reflective layer 365 may be further provided behind the light guide plate 33. The reflective layer 365 may improve efficiency of the lighting device 36 by reflecting light emitted from the LED 362.

Meanwhile, in the refrigerator according to an embodiment of the present disclosure, a door color may be changed or music may be played through a speaker module according to a user's voice command.

The refrigerator may be controlled to change color or brightness implemented in the panel assembly in conjunction with music played in the speaker module.

The refrigerator may recognize a user's voice command in a state where music is playing in the speaker module and may control operations according to the recognized voice command.

Hereinafter, the operation of the refrigerator will be described.

Figure 15:
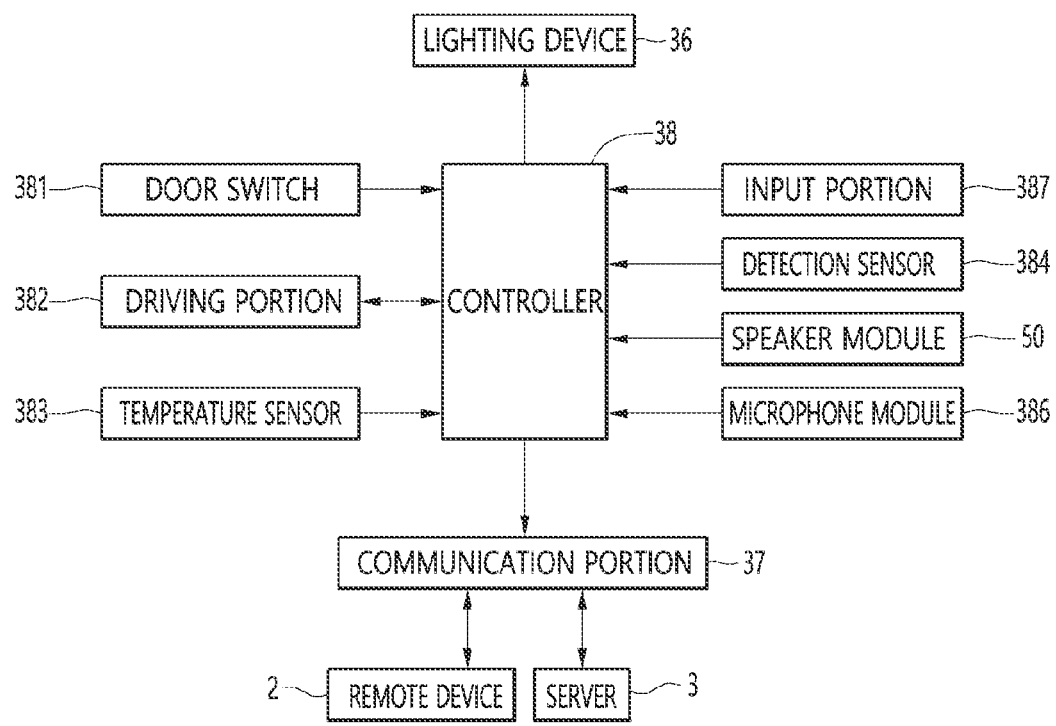
FIG. 15 is a control block diagram of a refrigerator according to an embodiment of the present disclosure.

FIG. 15 is a control block diagram of a refrigerator according to an embodiment of the present disclosure.

In the refrigerator 1, components of a refrigerating cycle including a compressor are operated under the control of the controller 38 to cool the inside of the refrigerator. The controller 38 controls the overall operation and may be referred to as a main controller, a main PCB, or a main controller.

To operate the refrigerator 1, the user directly manipulates the display of the refrigerator 1 to operate the refrigerator 1. It is possible to set the temperature of the refrigerator 1 or operate a specific function through a user's manipulation input. Direct manipulation by the user through the display may be referred to as manipulation through the input portion 387.

Meanwhile, the refrigerator 1 may recognize the user's voice and control the operation of the refrigerator 1. In detail, when the user speaks the set trigger voice in front of the refrigerator 1, the voice recognition mode is activated by the microphone module 386 and the voice recognition module 38a.

At this time, the controller 38 may control the speaker module 50 to output sound so that the user can recognize that the voice recognition mode is activated. Alternatively, the controller 38 may change the color of the door or allow the user to recognize that the voice recognition mode is activated through blinking.

The voice recognition mode is activated, and then the user inputs a voice command for operating the refrigerator 1. When a user issues a command, the voice signal input through the microphone module 386 is processed by the voice recognition module 38a and then transferred to the controller 38. The controller 38 controls a specific operation according to the transferred command.

The voice recognition module 38a has a structure capable of communicating with a remote server. Thus, the voice signal transferred from the microphone module 386 can be transferred to the server. The server may process and analyze the voice signal in natural language so that it can be used for operation of the refrigerator.

An example of a function operated by a user's voice is as follows.

A user may set a color or a screen implemented in the panel assembly 30 by the lighting device 36 according to a voice command. When the user commands to change the color of the door from the first color to the second color through a voice command, the controller 38 may control the lighting device 36 to change the color of the front surface of the door to the second color. For example, when the user issues a voice command, "Change to a so cool color," the controller 38 may control the lighting device 36 to change the panel assembly 30 to a so cool color based on preset so cool color information.

The refrigerator may play music through the speaker module 50 according to a user's voice command. When a user commands to play music through a voice command, the controller may control the speaker module 50 to play music.

A user can output specific information to the speaker module 50 or the display portion by a voice command. For example, when a user issues a voice command such as "tell me the weather" or "what time is it", the controller 38 can receive weather information or current time information from the server and control the speaker module 50 to output the weather or time information as a voice. The speaker module 50 can be controlled. Alternatively, the controller 38 may control weather or time information to be output on the screen of the display portion 25.

Various operating information, including changes in the operating state or setting state of the refrigerator 1 according to the user's voice command, may be output on a screen through a display or audio output through the speaker module 50. Alternatively, operation information may be recognized by the user through door color change.

The refrigerator 1 includes a communication portion 37 capable of communicating with the server 3 or the remote device 2.

A user can control the operation of the refrigerator 1 through the remote device 2. The remote device 2 may be various devices capable of communication, such as a dedicated terminal, a mobile phone, a tablet, a portable PC, a desktop PC, and a remote controller.

The user can set the front door color through the remote device 2. In detail, the user may select a color implemented in the panel assembly 30 through an application installed in the remote device 2. The controller 38 may control the lighting device 36 so that the panel assembly 30 shins in the set color based on information on the color selected by the user.

The user can play music in the speaker module 50 through the remote device 2. In detail, the user may connect the remote device 2 and the speaker module 50 wirelessly. For example, the remote device 2 and the speaker module 50 may be connected using Bluetooth communication. When the user selects music to play through the remote device 2, the speaker module 50 can play the music selected by the user.

At this time, the controller 38 may control the lighting device 36 in conjunction with music played by the speaker module 50. For example, the controller 38 adjusts the brightness of light emitted from the lighting device 36 or sets the color of light based on the frequency variation of the sound played by the speaker module 50 or the bit of the sound. This effect of adjusting the brightness of light in conjunction with music can also be referred to as a sound spectrum function.

Meanwhile, the lighting device 36 may be operated according to the operating state of the refrigerator 1.

For example, when the door 20 is open for a long time and a signal is not input from the door switch 381 for a set time or more, the lighting device may make the front surface of the door 20 shine in a different color to notify that the door 20 is open.

The lighting device 36 may be operated according to the detection sensor 384. For example, the detection sensor 384 may be a proximity sensor. In detail, when the proximity sensor detects the user's proximity, the brightness of the door 20 can be made darker by lowering the output of the lighting device 36 to prevent the user's glare.

When the user's proximity is detected by the detection sensor, the lighting device 36 can shorten the change period of the door color or cause the change to start, and allow the color to continuously change to perform a set operation when the user approaches.

Meanwhile, according to an embodiment of the present disclosure, in a state where music is being played in the speaker module 50, the light device may recognize a user's voice command and operate according to the voice command.

In addition, the controller 38 may control the driving portion 382 for operating the refrigerant cycle based on the temperature detected by the temperature sensor 383.

To this end, the controller 38 requires a bargin-in function capable of recognizing an external voice while playing music. This will be explained in detail.

Figure 16:
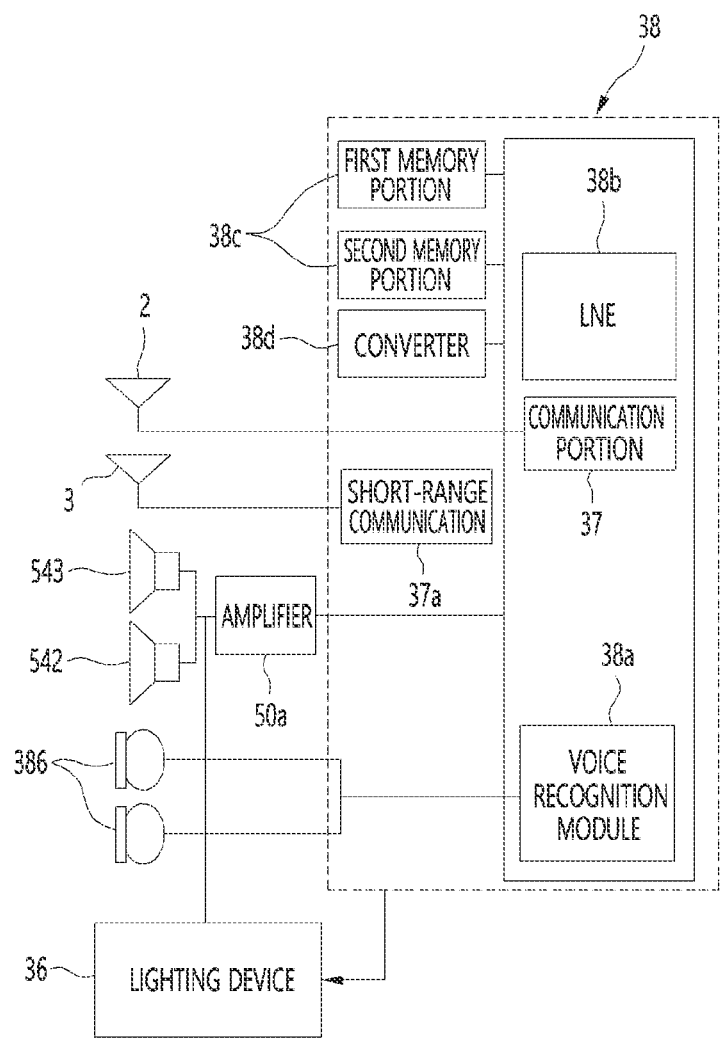
FIG. 16 is a diagram illustrating the configuration of a refrigerator control circuit.

FIG. 16 is a diagram illustrating the configuration of a refrigerator control circuit.

The processor module 38 is configured to control the microphone module 386 and the speaker module 50. In addition, the processor module 38 is configured to control the lighting device 36.

Both the microphone module 386 and the speaker module 50 are controlled by the processor module 38, so that when an external voice is recognized during music playback, the speaker module 50 can be controlled to stop music playback.

The processor module 38 may include a voice recognition module 38a for analyzing the user's voice signal recognized by the microphone module 386. The microphone module 386 and the voice recognition module 38a may be connected by wire or wirelessly. The user's voice signal input through the microphone module 386 is processed through the voice recognition module 38a, and the refrigerator can be operated according to the user's voice command. The voice recognition module 38a may communicate with the server 3 through the communication portion 37 of the processor module 38. The voice recognition module 38a may recognize the user's voice through the server 3.

In addition, the processor module 38 may include a short-range communication portion 37a so that the speaker module 50 can be wirelessly connected to the remote device 2 or the server 3.

The processor module 38 may be wired or wirelessly connected to control the speaker module 50. The speaker module 50 may include an amplifier 50a for controlling an output sound source. The processor module 38 may control the speaker module 50 by being connected to the amplifier 50a wirelessly or wired.

The processor module 38 may include a memory portion 38c. The memory portion 38c may include a plurality of volatile memories or non-volatile memories. The memory portion 38c may store color information of light emitted from the lighting device 36, music information played by the speaker module 50, and the like. In addition, information received from the server 3 may be stored.

The processor module 38 may further include an artificial intelligence module 38b. The artificial intelligence module 38b may recognize food stored in the refrigerator or acquire information necessary for image output.

The processor module 38 may be connected to the lighting device 36 by wire or wirelessly. The processor module 38 may control the lighting device 36 so that the color of the panel assembly 30 is implemented according to a user's setting.

In this way, the processor module 38 can simultaneously control the microphone module 386 and the speaker module 50, so that the speaker module 50 can recognize the user's voice while playing music.

The refrigerator according to an embodiment of the present disclosure may change the color of the front surface of the door according to a user's voice command.

Figure 17:
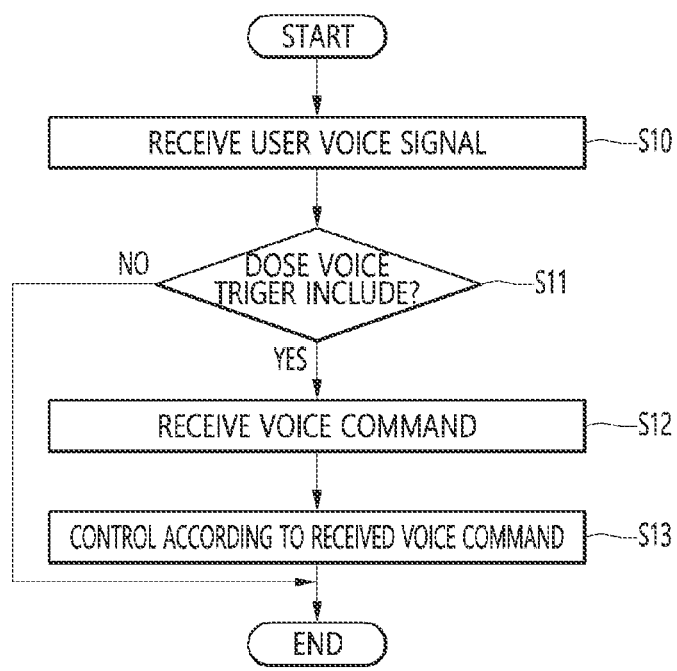
FIG. 17 is a flowchart illustrating a state where a refrigerator according to an embodiment of the present disclosure is controlled.

FIG. 17 is a flowchart illustrating a state where a refrigerator according to an embodiment of the present disclosure is controlled.

When the user speaks a voice in front of the refrigerator 1, the microphone module 386 may transfer the input voice signal to the controller 38. At this time, the user may speak a preset voice trigger to activate the voice recognition mode of the refrigerator 1 (S10).

The controller 38 may transfer the received voice signal to the server 3 to determine whether the input voice signal includes a spoken trigger (S11).

When the input voice signal includes a voice trigger, the controller 38 may activate the voice recognition mode.

At this time, the controller 38 may output a set sound through the speaker module 50 to inform the user that the voice recognition mode is activated.

Alternatively, the controller 38 may notify the user that the voice recognition mode is activated by controlling the lighting device 36 so that the front surface of the door 20 changes color or blinks.

When the user speaks a voice command in a state where the voice recognition mode is activated, the microphone module 386 may transfer the input voice signal to the controller 38.

At this time, the user may issue a voice command to change the color of the refrigerator door 20. For example, the user may issue a voice command saying "change color", "change color to so cool", or "change color to spring spring". Here, "so cool color" or "spring spring color" may be defined as a name of a preset color.

In addition, the preset color may include color information for implementing a moving screen by changing the color according to the operating time of the lighting device 36.

Alternatively, the user may specifically designate a color to be changed by commanding "change to color 00".

The controller 38 may transfer the received voice signal to the server 3. The server 3 may determine a voice command by processing and analyzing the received voice signal in natural language. The controller 38 may receive a voice command determined by the server 3 through the communication portion 37 (S12).

The controller 38 may control the refrigerator 1 according to a voice command received from the server 3. The controller 38 may control the lighting device 36 so that the panel assembly 30 lights in a color set by the user according to the received voice command (S13).

In the refrigerator according to another embodiment of the present disclosure, when there is a user's voice command in a state where the speaker module 50 is playing music, the user's voice command can be recognized and executed, and then the speaker module 50 can play the music.

Figure 18:
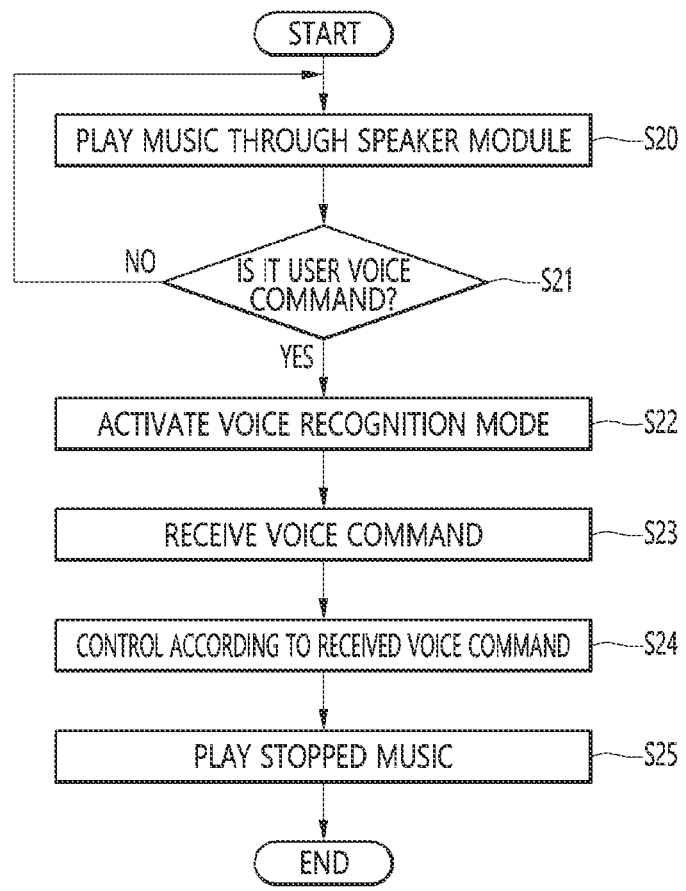
FIG. 18 is a flowchart illustrating a state where a refrigerator according to another embodiment of the present disclosure is controlled.

FIG. 18 is a flowchart illustrating a state where a refrigerator according to another embodiment of the present disclosure is controlled.

The user can set the speaker module 50 to play music.

The controller 38 may control the speaker module 50 to play music according to user settings (S20).

For example, the user may set the speaker module 50 to play music through the remote device 2. In detail, the remote device 2 and the speaker module 50 may be connected wirelessly, such as Bluetooth. When the user selects music to play on the remote device 2, the selected music can be output from the speaker module 50.

A user may set the speaker module 50 to play music through a voice command. A user may set to play preset music through a voice command.

In detail, upon receiving the user's voice command, the controller 38 may transfer a voice signal to the server 3 to determine the user's voice command. In addition, the controller 38 may control the speaker module 50 to play music according to a user's voice command.

While music is being played, the user may change the settings of the refrigerator 1 or check state information by inputting a voice command.

In detail, when a user's voice is input through the microphone module 386, the controller 38 may determine whether or not a trigger voice is included in the received user's voice through the server 3 (S21).

When the user's voice signal includes the trigger voice, the controller 38 may activate a voice recognition mode to receive and analyze the user's voice command. In addition, the controller 38 may control the speaker module 50 to stop playing music or to lower the volume (S22).

The controller 38 may control the speaker module 50 to output a set sound to notify the user that the voice recognition mode is activated. Alternatively, the controller 38 may change the color of the door or control the lighting device 36 to blink the door.

When the voice recognition mode is activated, the user may issue a voice command. For example, the user may issue a voice command saying "change color", "change color to so cool", or "change color to spring spring".

As another example, the user may issue voice commands such as "open the door", "close the door", and "set the temperature of the refrigerating chamber to 00 degrees".

As another example, the user may issue an information confirmation command, such as "tell me the weather", "what time is it", or "how many cabbages are there?"

The microphone module 386 may transfer a user's voice signal to the controller 38. The controller 38 may transfer the received voice signal to the server 3. The server 3 may analyze the received voice signal, convert the user's voice command into data, and transfer the converted data to the controller 38 (S23).

The controller 38 may perform an operation according to the received voice command (S24).

For example, the controller 38 may control the lighting device 36 so that a color set by a user is implemented on a panel assembly according to a user's voice command.

Alternatively, the controller 38 may open or close the door according to a user's voice command or control the operation of the compressor to adjust the temperature of the refrigerating chamber to a temperature set by the user.

Alternatively, the controller 38 may control to receive information on weather and time through the server 3 and to output the information as voice through the speaker module 50.

Alternatively, the controller 38 may output information about food requested by the user through the speaker module 50 as voice based on the information about the stored food.

The controller 38 may control the speaker module 50 to play stopped music after the user's voice command is executed (S25).

According to another embodiment of the present disclosure, the refrigerator 1 may adjust the color or brightness of the door 20 in conjunction with music being played in the speaker module 50.

Figure 19:
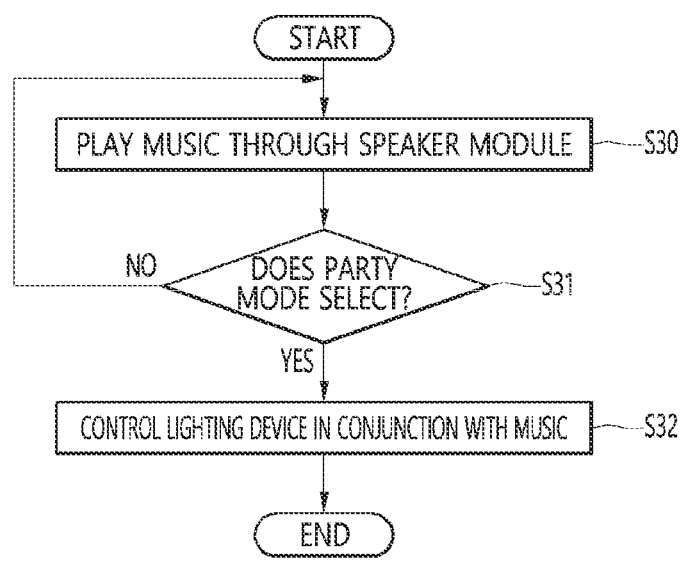
FIG. 19 is a flowchart illustrating a state where a refrigerator according to another embodiment is controlled.

FIG. 19 is a flowchart illustrating a state where a refrigerator according to another embodiment is controlled.

The controller 38 may control the speaker module 50 to play music according to user settings (S30).

The speaker module 50 is wirelessly connected to the user's remote device 2, and when the user selects music to be played on the remote device 2, the music selected by the speaker module 50 can be played.

In addition, the user can play music in the speaker module 50 through a voice command.

At this time, the user may select "party mode" through the remote device 2 or a voice command. "Party mode" may be defined as a set mode in which the color or brightness of the door changes in conjunction with the music being played (S31).

When the user sets the party mode, the controller 38 can control the lighting device 36 based on the frequency or bit information of the music output from the speaker module 50 (S32).

For example, the controller 38 may control the lighting device 36 to change the color of the door to a set color according to a frequency range of music.

For example, the controller 38 may control the lighting device 36 to change the brightness of the front surface of the door according to the beat of the music. The controller 38 may control the intensity of light of the lighting device 36 so that the brightness of the front surface of the door becomes darker or brighter based on the frequency or beat of the music.

Figure 20:
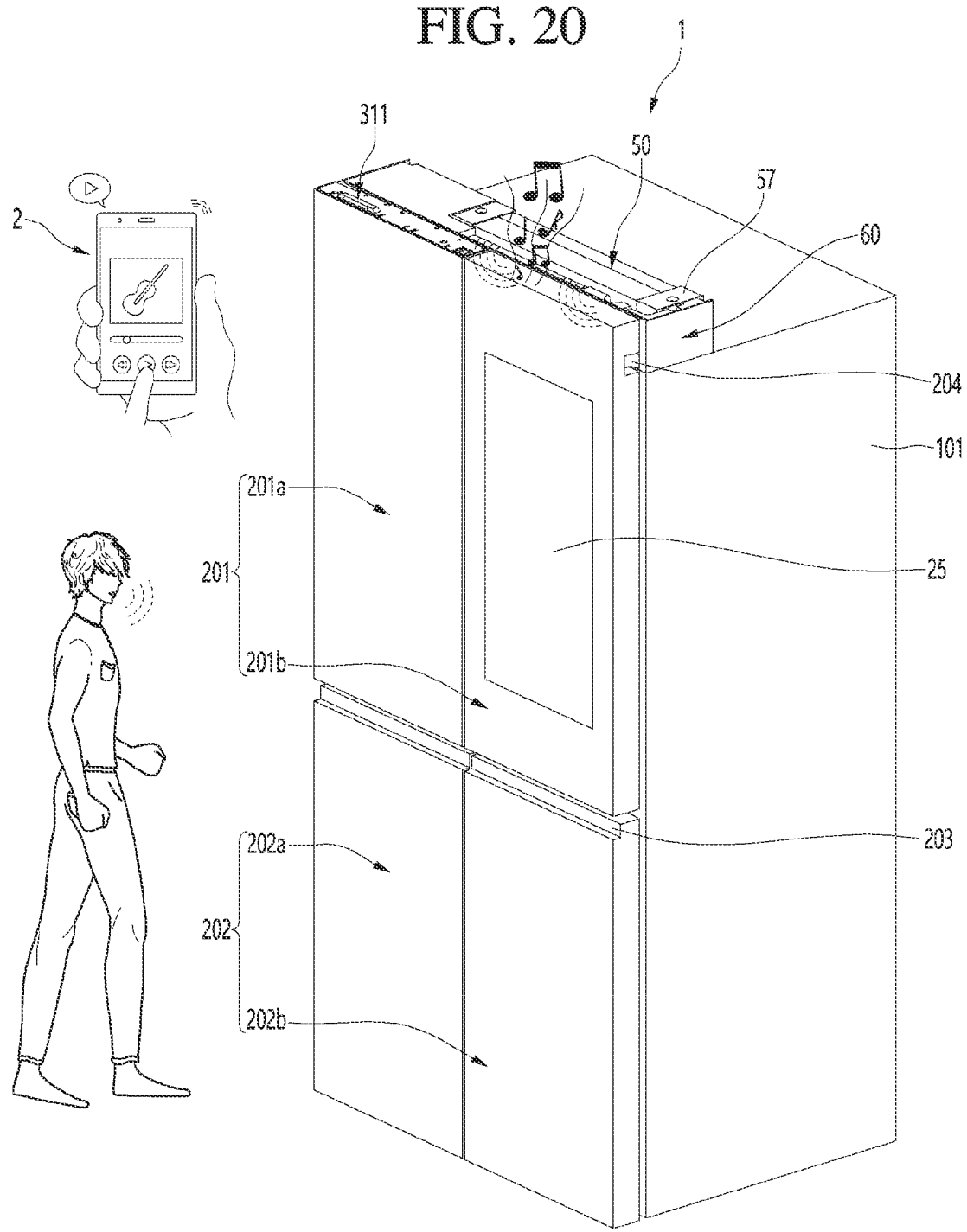
FIG. 20 is a diagram illustrating a state where sound is output from the speaker module.
Figure 21:
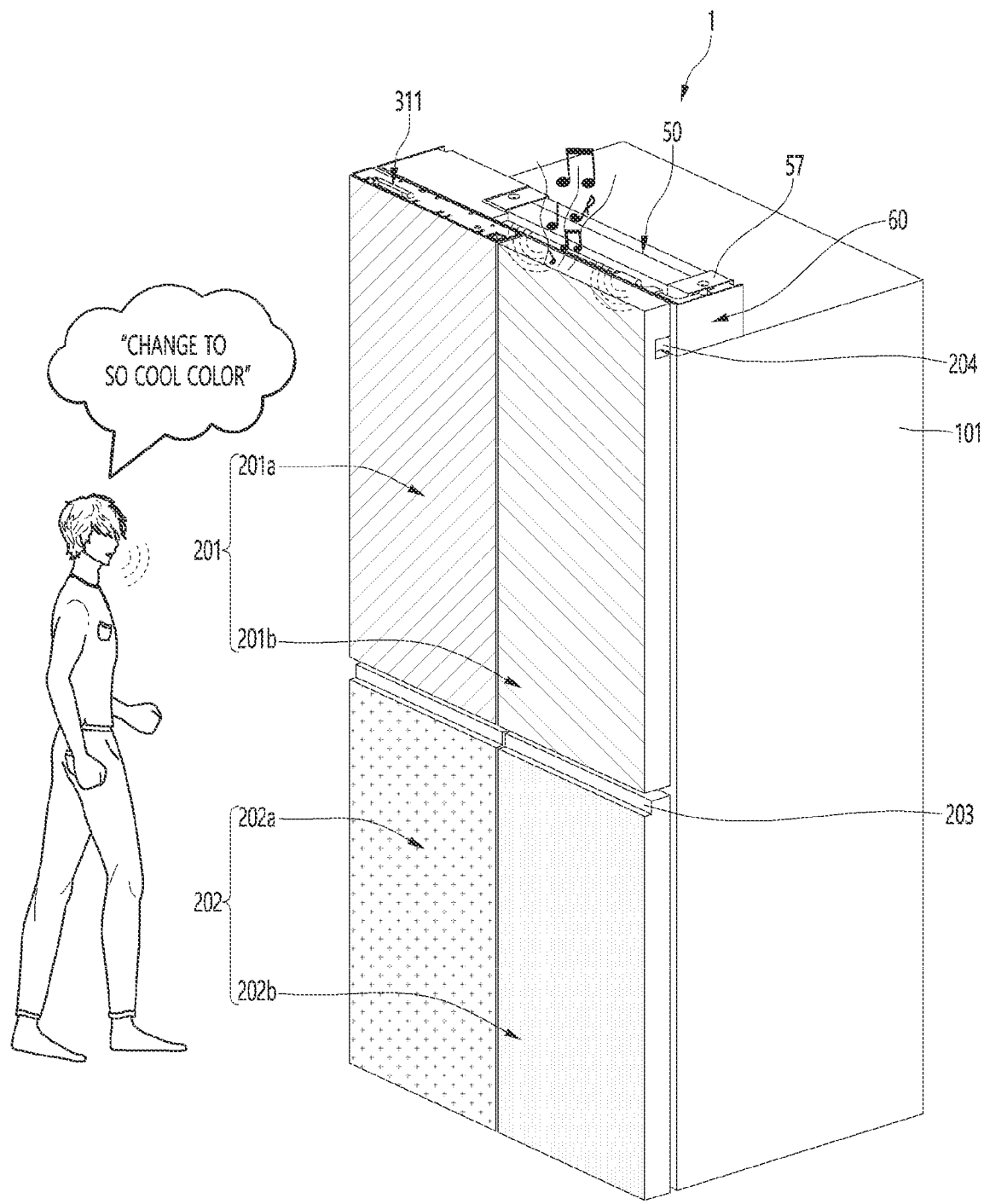
FIG. 21 is a diagram illustrating a state where the front surface color of a door is changed by recognizing a user's voice command.

FIG. 20 is a diagram illustrating a state where sound is output from the speaker module, and FIG. 21 is a diagram illustrating a state where the front surface color of a door is changed by recognizing a user's voice command.

Referring to the drawings, the user can set the speaker module 50 to play music through a remote device 2 or a voice command.

When a user's voice command is input through the microphone module 386 while the speaker module 50 is playing music, the controller 38 can activate the microphone module 386 and the voice recognition module 38a to recognize the user's voice.

The controller 38 checks whether a trigger voice is included in the received voice signal, and if the trigger voice is included in the received voice signal, the music being played in the speaker module 50 may be stopped.

In addition, the controller 38 may output a sound set in the speaker module 50 or change the color of the door to inform the user that the voice recognition mode is activated.

When the user inputs a voice command, "Change the color to so cool," the microphone module 386 may transfer the input voice signal to the controller 38. The controller 38 may control the lighting device 36 to change the color of the door 20 to a so cool color according to a voice command analyzed through the server 3.

The controller 38 may control the speaker module 50 to play stopped music after changing the color of the door.

Meanwhile, panel assemblies according to embodiments of the present disclosure may be applied not only to refrigerators but also to various other home appliances.

Figure 22:
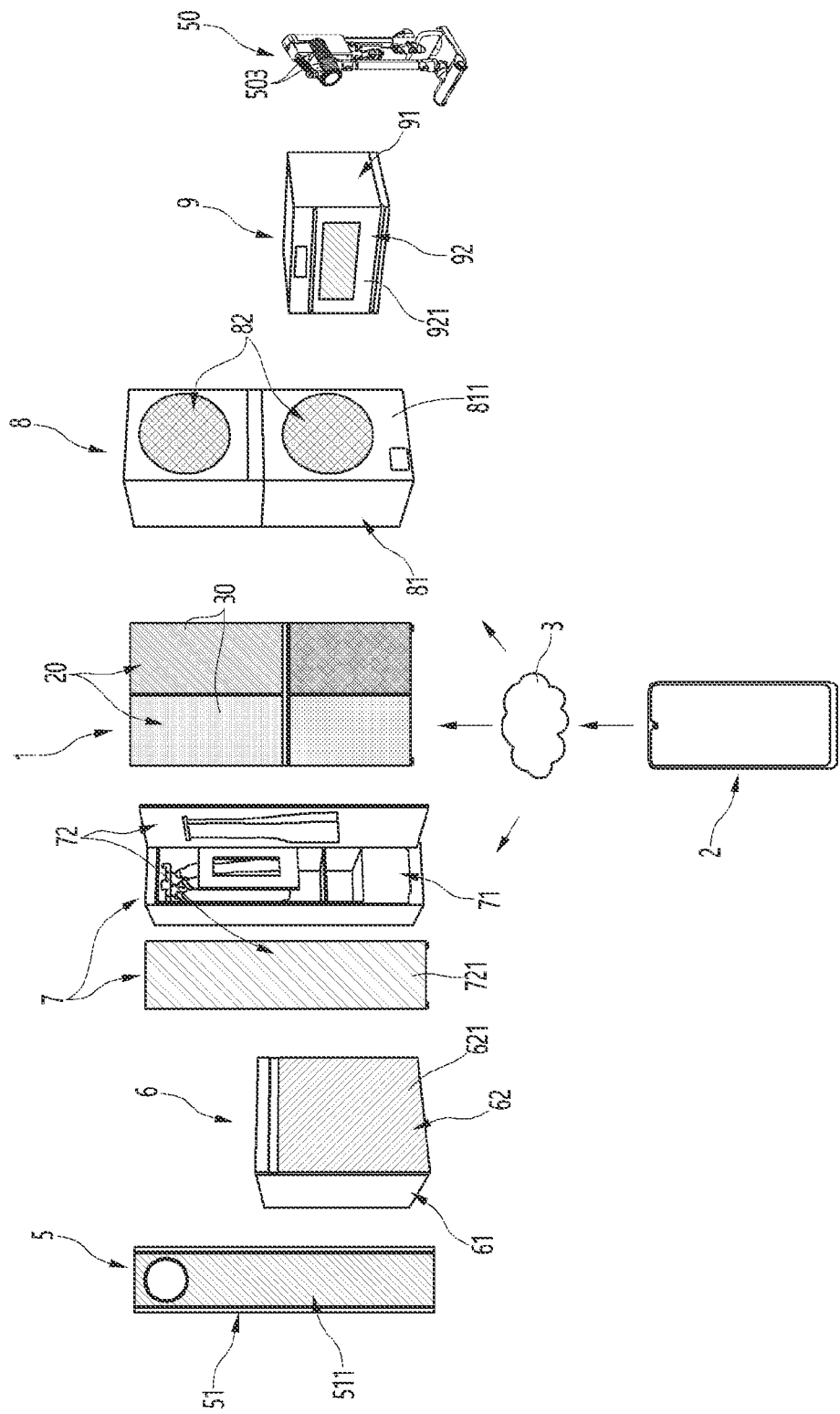
FIG. 22 is a diagram illustrating an example of controlling colors of home appliances to which a panel assembly is applied using a remote device.

FIG. 22 is a diagram illustrating an example of controlling colors of home appliances to which a panel assembly is applied using a remote device.

As illustrated in the drawing, the outer appearance of the home appliance according to the embodiment of the present disclosure may be formed by the panel assembly 30, and the color of the outer appearance may be changed into a color set by the user according to the operation of the lighting device 36. The outer appearance of the panel assembly 30 can be expressed in various colors by the light of the lighting device 36 emitted from the rear of the panel 31.

The home appliance may be any one of a refrigerator 1, an air conditioner 5, a dishwasher 6, a clothes care machine 7, a washing machine 8, a cooking appliance 9, and a vacuum cleaner 50. The same structure as the panel assembly of the embodiments of the present disclosure is applied so that the color of the outer appearance of the front surface can be freely changed.

A space provided with a heat exchanger and a fan may be formed inside the case 51 (or cabinet) forming the outer appearance of the air conditioner 5 indoor portion. In addition, the front surface of the case 51 may be formed by the panel assembly 511. The panel assembly 511 may have the same structure as the panel assembly 30 of the refrigerator 1 described above and can emit light.

In the dishwasher 6, a space for washing dishes may be formed inside the case 61 (or cabinet) forming the outer appearance. In addition, the front surface of the case 61 may be opened and closed by the door 62, and the front surface of the door 62 may be formed by the panel assembly 621. The panel assembly 621 may have the same structure as the panel assembly 30 of the refrigerator 1 described above and can emit light.

A space in which clothes are stored may be formed inside a case 71 (or cabinet) forming an outer appearance of the clothes management device 7. In addition, the front surface of the case 71 may be opened and closed by a door 72, and the front surface of the door 72 may be formed by a panel assembly 721. The panel assembly 721 may have the same structure as the panel assembly 30 of the refrigerator 1 described above and can emit light.

The washer 8 or dryer may have a space for washing or drying inside the case 81 (or cabinet) forming the outer appearance. In addition, the front surface of the case 81 may be opened and closed by a door 82. Meanwhile, the front surface of the case 81 may be formed by the panel assembly 811. The panel assembly 811 may have the same structure as the panel assembly 30 of the refrigerator 1 described above and can emit light.

A space for cooking food may be formed inside a case 91 (or a cabinet) forming an outer appearance of the cooking appliance 9. In addition, the front surface of the case 91 may be opened and closed by a door 92, and the front surface of the door 92 may be formed by a panel assembly 921. The panel assembly 921 may have the same structure as the panel assembly 30 of the refrigerator 1 described above and can emit light.

Accordingly, in the home appliance equipped with the panel assembly, the panel assembly shines in a set color by a user setting, so that the color of the outer appearance of the home appliance can be changed to the set color.

What is claimed is:

1. A refrigerator comprising:
   a cabinet defining a storage space;
   a door configured to open and close the storage space and comprising:
      a door body disposed at the cabinet; and
      a panel assembly mounted on a front surface of the door body and having a lighting device configured to change a color of a front surface of the door;
   a microphone configured to receive voice;
   a speaker configured to output audio; and
   a controller configured to, based on the microphone receiving a voice command, control the lighting device to change the color of the front surface of the door to a color associated with the voice command.

2. A household appliance comprising:
   a cabinet defining a storage space;
   a door configured to open and close the storage space and comprising:
      a door body disposed at the cabinet, and
      a panel assembly mounted on a front surface of the door body and having a lighting device configured to change a color of a front surface of the door;
   a microphone configured to receive voice;
   a speaker configured to output audio; and
   a controller configured to control the lighting device to change the color of the front surface of the door in coordination with the output audio from the speaker.

3. The refrigerator of claim 1, wherein the door body includes:
   a body plate configured to receive the panel assembly,
   a door liner defining a rear surface of the door,
   side decorations defining both left and right sides,
   an upper cap decoration defining an upper surface of the door body,
   a lower cap decoration defining a lower surface of the door body, and
   a heat insulating material received at a space inside the door body.

4. The refrigerator of claim 1, wherein the panel assembly includes:
   a front plate defining an outer appearance of a front surface of the panel assembly,
   a light guide plate configured to guide light emitted from the lighting device,
   an upper bracket defining an upper surface of the panel assembly,
   a lower bracket defining a lower surface of the panel assembly, and
   a back cover defining a rear surface of the panel assembly.

5. The refrigerator of claim 4, wherein the lighting device is mounted on the lower bracket, and
   wherein the panel assembly further includes a light supporter configured to support the lighting device and dissipate heat generated from the lighting device by conduction.

6. The refrigerator of claim 5, wherein the light supporter includes:
   a first supporting portion supporting the lighting device, and
   a second supporting portion contacting the back cover.

7. The refrigerator of claim 4, wherein the panel assembly further includes a support member having a structure in which the light guide plate and the front plate are coupled and providing a predetermined distance between the light guide plate and the front plate.

8. The refrigerator of claim 1, wherein the door defines an opening at an upper surface and provides a door cover covering the opening at the upper surface,
wherein the door cover includes:
a cover portion covering the opening at the upper surface, and
a module mounting portion extending downward from the cover portion and inserted into an inner space of the door, and
wherein the microphone is mounted on the module mounting portion.

9. The refrigerator of claim 8, wherein the module mounting portion provides a processor module comprising the controller,
wherein the processor module is connected to the microphone, the speaker, and the lighting device, and
wherein the processor module includes a voice recognition module configured to interpret instructions within the received voice command.

10. The refrigerator of claim 1, wherein the speaker is disposed on an upper surface of the cabinet.

11. The refrigerator of claim 1, wherein the controller is configured to, based on a determination that the voice command includes a trigger voice, control the lighting device to change the color of the front surface of the door.

12. The refrigerator of claim 1, wherein the controller is configured to control the lighting device to change the color of the front surface of the door in coordination with the output audio from the speaker.

13. The refrigerator of claim 1, further comprising:
a short-range communicator configured to connect a remote device to the speaker,
wherein the controller is configured to control the speaker to output the audio based on input received from the remote device through the short-range communicator.

14. The household appliance of claim 2, wherein the door body includes:
a body plate configured to receive the panel assembly,
a door liner defining a rear surface of the door,
side decorations defining both left and right sides,
an upper cap decoration defining an upper surface of the door body,
a lower cap decoration defining a lower surface of the door body, and
a heat insulating material received at a space inside the door body.

15. The household appliance of claim 2, wherein the panel assembly includes:
a front plate defining an outer appearance of a front surface of the panel assembly,
a light guide plate configured to guide light emitted from the lighting device,
an upper bracket defining an upper surface of the panel assembly;
a lower bracket defining a lower surface of the panel assembly; and
a back cover defining a rear surface of the panel assembly.

16. The household appliance of claim 15, wherein the lighting device is mounted on the lower bracket,
wherein the panel assembly further includes a light supporter configured to support the lighting device inside and dissipate heat generated from the lighting device by conduction.

17. The household appliance of claim 2, wherein the door further defines an opening at an upper surface and provides a door cover covering the opening at the upper surface,
wherein the door cover includes:
a cover portion covering the opening at the upper surface, and
a module mounting portion extending downward from the cover portion and inserted into an inner space of the door, and
wherein the microphone is mounted on the module mounting portion.

18. The household appliance of claim 17, wherein the module mounting portion provides a processor module comprising the controller,
wherein the processor module is connected to the microphone, the speaker, and the lighting device, and
wherein the processor module includes a voice recognition module configured to interpret instructions within the received voice command.

19. The household appliance of claim 2, wherein the speaker is disposed on an upper surface of the cabinet.

* * * * *